(12) United States Patent
Facca et al.

(10) Patent No.: US 11,626,922 B2
(45) Date of Patent: Apr. 11, 2023

(54) AUTO-ACQUISITION CELLULAR REPEATER

(71) Applicant: DATADRILL COMMUNICATIONS INC., Calgary (CA)

(72) Inventors: Dario Facca, Calgary (CA); Paul Kennedy, Calgary (CA); Bryan Cockwell, Cochrane (CA); Kevin Ryan, Calgary (CA); Curtis Korchynski, Calgary (CA); Ryan Cameron, Calgary (CA); Edwin Sayson, Calgary (CA)

(73) Assignee: DATADRILL COMMUNICATIONS INC., Calgary (CA)

( * ) Notice: Subject to any disclaimer, the term of this patent is extended or adjusted under 35 U.S.C. 154(b) by 27 days.

(21) Appl. No.: 17/477,443

(22) Filed: Sep. 16, 2021

(65) Prior Publication Data

US 2022/0085868 A1 Mar. 17, 2022

Related U.S. Application Data

(60) Provisional application No. 63/079,138, filed on Sep. 16, 2020.

(51) Int. Cl.
*H04B 7/155* (2006.01)
*H01Q 3/04* (2006.01)
*H04B 17/318* (2015.01)

(52) U.S. Cl.
CPC ........... *H04B 7/15507* (2013.01); *H01Q 3/04* (2013.01); *H04B 17/318* (2015.01)

(58) Field of Classification Search
CPC ................................................. H04B 7/15507
See application file for complete search history.

(56) References Cited

U.S. PATENT DOCUMENTS

| | | | | |
|---|---|---|---|---|
| 5,903,835 | A * | 5/1999 | Dent .................. | H04B 7/18571 370/324 |
| 7,764,924 | B1 * | 7/2010 | Smithey ............. | H04B 7/15535 455/24 |
| 9,246,207 | B2 | 1/2016 | Smith et al. | |
| 2005/0129137 | A1 * | 6/2005 | Yamada .............. | H04B 7/0848 375/267 |
| 2015/0380816 | A1 * | 12/2015 | Tajika ................... | H04W 24/02 370/315 |
| 2017/0150326 | A1 * | 5/2017 | Hampel ............. | H04W 72/042 |

* cited by examiner

*Primary Examiner* — Hsinchun Liao
(74) *Attorney, Agent, or Firm* — Norton Rose Fulbright Canada LLP

(57) ABSTRACT

Systems and methods for rebroadcasting a target signal stream. A system includes a donor antenna circuit; a processor coupled to the donor antenna circuit. The processor may be configured to: receive a signal representing a request for rebroadcasting a target signal stream to a local region, the target signal stream associated with prioritization of a first signal type relative to at least one co-existing signal type; determining a target position to orient the donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and transmitting a signal to orient the donor antenna circuit relative to the target source.

20 Claims, 16 Drawing Sheets

AUTO-ACQUISITION CELLULAR REPEATER

CROSS REFERENCE TO RELATED APPLICATIONS

This application claims priority from U.S. provisional patent application No. 63/079,138, entitled "AUTO-ACQUISITION CELLULAR REPEATER", filed on Sep. 16, 2020, the entire contents of which are hereby incorporated by reference herein.

FIELD

This disclosure relates to signal amplifiers, in particular, cellular signal boosters and repeaters.

BACKGROUND

Cellular repeaters may be signal amplifiers configured to receive radio frequency signals over a cellular network from surrounding cell towers. Cellular repeater systems may include a donor antenna circuit. In some examples, radio frequency signals received at the donor antenna circuit may be amplified or boosted for rebroadcasting to a local region proximal to respective cellular repeater systems.

SUMMARY

Embodiments of systems and methods of rebroadcasting a target signal stream are described in the present disclosure.

In an aspect, the present disclosure describes a system for rebroadcasting a target signal stream. The system may include: a donor antenna circuit; a processor coupled to the donor antenna circuit; and a memory coupled to the processor. The memory may store processor-executable instructions that, when executed, configure the processor to: receive a signal representing a request for rebroadcasting a target signal stream to a local region, the target signal stream associated with prioritization of a first signal type relative to at least one co-existing signal type; determining a target position to orient the donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and transmitting a signal to orient the donor antenna circuit relative to the target source.

In another aspect, the present disclosure describes a method for rebroadcasting a target signal stream. The method includes receiving a signal representing a request for rebroadcasting a target signal stream to a local region, the target signal stream associated with prioritization of a first signal type relative to at least one co-existing signal type; determining a target position to orient a donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and transmitting a signal to orient the donor antenna circuit relative to the target source.

According to another aspect, there is provided a computer-implemented method for selecting an azimuth angle to position a donor antenna to receive signal for repeating, the method comprising: rotating the donor antenna to pre-determined azimuth increments; at each of the pre-determined azimuth increments, measuring a received signal strength indicator (RSSI) received by the donor antenna; identifying a selection of azimuth angles based on the RSSI received at the azimuth increments and angular separation between the azimuth angles; for each of the selection of the azimuth angles: rotating the donor antenna to that azimuth angle; determining a data throughput of signal received at that azimuth angle; generating an isolation test signal; transmitting the isolation test signal with a rebroadcast antenna; and determining an antenna isolation based on a measurement of the isolation test signal received at the donor antenna at that azimuth angle; determining a score for each of the selection of azimuth angles based on the RSSI, the data throughput, and the antenna isolation of that azimuth angle; and selecting, based on the scores, the azimuth angle to position the donor antenna to receive signal for repeating by the rebroadcast antenna.

In some embodiments, the selection of azimuth angles includes five azimuth angles with highest measured RSSI values and that are at least 40 degrees apart.

In some embodiments, the RSSI is determined using a max hold technique based on an average of maximum readings for a number of sample points measured over a number of trace sweeps.

In some embodiments, the number of sample points is fifty, and the number of trace sweeps is fifty.

In some embodiments, the score for each of the selection of azimuth angles is based on a weighting of the RSSI, the data throughput, and the antenna isolation of that azimuth angle.

In some embodiments, the method further comprises ranking the selection of azimuth angles based on the scores.

In some embodiments, the selecting comprises selecting a next ranked azimuth angle.

In some embodiments, the method further comprises positioning the donor antenna to aim at the selected azimuth angle.

In some embodiments, the method further comprises activating a signal amplifier to amplify a signal received at the donor antenna and for rebroadcasting at the rebroadcast antenna.

In some embodiments, the donor antenna includes an antenna for voice services and an antenna for data services.

According to another aspect, there is provided a repeater system comprising: a rotator rotatable about an azimuth; a donor antenna coupled to the rotator; a spectrum analyzer to measure a received signal strength indicator (RSSI) from signal received at the donor antenna; a processor; and a memory in communication with the processor, the memory storing instruction that, when executed by the processor, cause the processor to: instruct rotator to rotate the donor antenna to pre-determined azimuth increments; at each predetermined azimuth increment, receive from the spectrum analyzer an RSSI measured at that azimuth increment; identify a selection of azimuth angles from the pre-determined azimuth increments based on the RSSI received at the azimuth angles and angular separation between the azimuth angles; for each of the selection of azimuth angles: instruct rotator to rotate the donor antenna to that azimuth angle; determine a data throughput of signal received at that azimuth angle; generate, with a signal generator, an isolation test signal; transmit the isolation test signal with a rebroadcast antenna; and determine an antenna isolation based on a measurement by the spectrum analyzer of the isolation test signal received at the donor antenna; determine a score for each of the selection of azimuth angles based on the RSSI, the data throughput, and the antenna isolation of that azimuth angle; and select, based on the scores, the azimuth angle to position the donor antenna to receive signal for repeating by the rebroadcast antenna.

In some embodiments, the selection of azimuth angles includes five azimuth angles with highest measured RSSI values and that are at least 40 degrees apart.

In some embodiments, the RSSI is determined using a max hold based on an average of maximum readings for a number of sample points measured over a number of trace sweeps.

In some embodiments, the number of sample points is fifty, and the number of trace sweeps is fifty.

In some embodiments, the score for each of the selection of azimuth angles is based on a weighting of the RSSI, the data throughput, and the antenna isolation of that azimuth angle.

In some embodiments, the memory stores further instructions that, when executed by the processor, cause the processor to rank the selection of azimuth angles based on the scores.

In some embodiments, the selecting comprises selecting a next ranked azimuth angle.

In some embodiments, the memory stores further instructions that, when executed by the processor, cause the processor to instruct the rotator to position the donor antenna to aim at the selected azimuth angle.

In some embodiments, the memory stores further instructions that, when executed by the processor, cause the processor to activate a signal amplifier to amplify a signal received at the donor antenna and for rebroadcasting at the rebroadcast antenna.

In some embodiments, the donor antenna includes an antenna for voice services and an antenna for data services.

In another aspect, a non-transitory computer-readable medium or media having stored thereon machine interpretable instructions which, when executed by a processor, may cause the processor to perform one or more methods described herein.

Other features will become apparent from the drawings in conjunction with the following description.

BRIEF DESCRIPTION OF DRAWINGS

In the figures which illustrate example embodiments.

DETAILED DESCRIPTION

Figure 1:
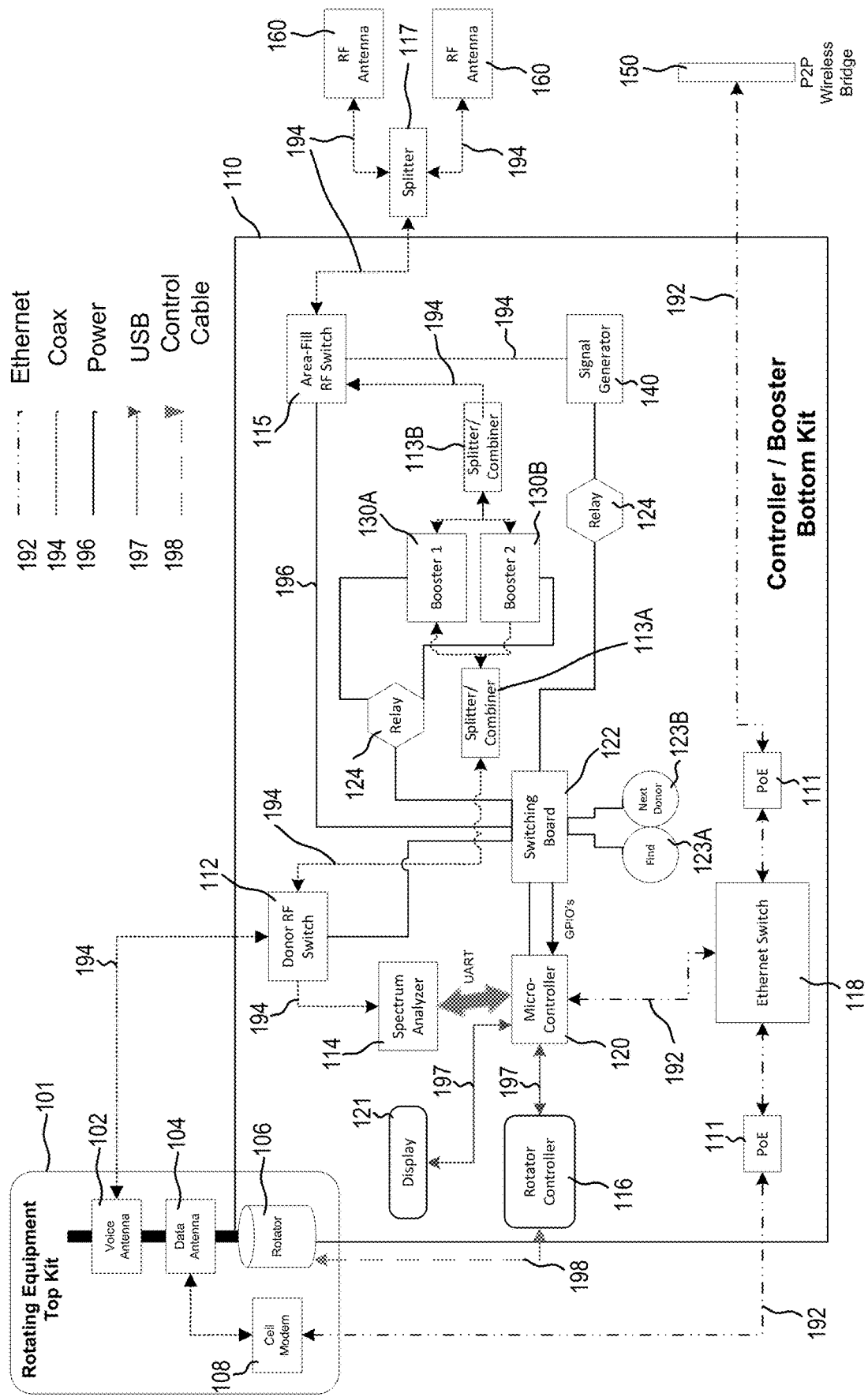
FIG. 1 is a schematic block diagram of a repeater system, according to an embodiment.

The present disclosure describes embodiments of signal repeater systems and methods of operating the same.

Signal repeater systems may include cellular signal repeaters configured to receive cellular signals from one or more surrounding cellular towers and, subsequently, rebroadcasting or amplifying the received cellular signals for client devices in a local region proximal to the signal repeater system. In some embodiments, signal repeater systems may be configured to receive cellular signals from the respective client devices and, subsequently transmitting the received cellular signals to cellular towers.

Embodiments of the present disclosure may be configured for local environments such as regions having oil/gas exploration and production, or other remote geographical regions relative to cellular towers.

In some situations, cellular repeaters may be configured atop tower structures or drilling rig derricks in statically defined positions or orientations. In situations where such cellular repeaters may need to be moved from location-to-location, it may be time consuming and resource intensive to re-configure the respective cellular repeaters atop subsequent tower structures or drilling rig derricks.

Continuing with an example oil/gas exploration and production site, when re-locating or re-configuring cellular repeaters, a worksite technician may need to travel to a target site to manually change a donor antenna azimuth according to radio frequency path profiles between the cellular repeater location and surrounding cell towers. Such operations include the worksite technician climbing a tower or drilling rig derrick in a variety of weather conditions (such as extreme cold or heat). Climbing a derrick can mean an interruption in drilling operations for rig applications and may also pose a safety concern for the worker working at heights. In some situations, having the worker travel to location may be time consuming and resource intensive. Further, manually re-configuring statically positioned and oriented cellular repeaters may increase physical injury risks to worksite technicians. Furthermore, operations for re-configuring respective cellular repeaters may require that exploration and production site operations be halted, thereby impeding productivity.

In a situation where a statically oriented and positioned cellular repeater may not performing as required, operations for troubleshooting the cellular repeater may require shutting the site operation down to allow a worker to climb the tower or derrick to investigate, which can be costly and again poses a safety risk. Tools to calibrate cellular repeaters to ensure a standard of quality of service, such for spectrum analyzers, may be costly and may not be available or require special training to use. Manual troubleshooting also leaves room for human error in determining when a cellular repeater is properly functioning. It may be beneficial to provide a remotely configurable signal repeater systems.

In some situations, cellular repeaters may be configured to re-broadcast or amplify one or a combination of voice-based signals or data-based signals (e.g., non-voice based signals). Voice-based signals may include signals representing audio, and such signals may require a substantially constant sequence of data to be transmitted from a source device to a receiver device to maintain a desirable service level (e.g., two or more parties having a voice conversation). In some embodiments, data-based signals may not require a substantially constant sequence of data to be transmitted to maintain a desirable data transmission service level. It may be beneficial to provide signal repeater systems configured to optimize positioning of a donor antenna circuit to provide a desirable data transmission service level for a combination of voice-based signals and data-based signals.

FIG. 1 is a schematic block diagram of a repeater system 100 configured to repeat or re-broadcast received radio frequency ("RF") signals, in accordance with embodiments of the present disclosure. Features of signal repeater systems described in the present disclosure may be described with reference to systems for broadcasting cellular signals. It may be appreciated that other types of signals for re-broadcast by embodiments of the signal repeater systems may be contemplated.

The repeater system 100 includes rotating equipment 101 (illustrated in FIG. 1 as "Rotating Equipment Top Kit") in communication with a controller/booster 110 (illustrated in FIG. 1 as "Controller/Booster Bottom Kit"). FIG. 1 illustrates components of rotating equipment 101 and controller/booster 110, and communication transmission lines between components. Examples of communication transmission lines between components of repeater system 100 may include Ethernet cable or coaxial cable. In some other embodiments, other types of communication transmission lines may be used. In the repeater system 100 illustrated in FIG. 1, power transmission lines may also interconnect components of the repeater system 100.

Repeater system 100 may be configured to pre-emptively or automatically acquire, boost and repeat a downlink input or donor signal received at donor antenna(s). In some embodiments, a donor antenna may be an antenna circuit including a voice antenna 102 for voice services and/or data antenna 104 for data services. The donor antenna circuit may be configured to receive signals from a donor site or source such as a surrounding cell tower (or cellular source tower) and, subsequently to rebroadcast the signal using area-fill antennas such as area-fill ("AF") antennas 160. The expression "donor antenna" may also be referred to as a "donor antenna circuit" having one or more features described herein.

Further, the repeater system 100 may also be configured to boost and repeat an uplink signal (such as from a mobile device) received at AF antennas 160 for transmission by the donor antenna circuit to one or more nearby cellular towers. As illustrated, in some embodiments, the donor antenna circuit may include one or a combination of a voice antenna 102 or data antenna 104.

The repeater system 100 may not have knowledge of the location of source cell towers or features of donor signal from such sources, such as technologies, bands, or throughput capacity (such as data throughput or speed).

The repeater system 100 may be configured to implement, by way of hardware and/or software as described herein, an automated search to automatically scan for donor signals from donor sites or sources such as cell towers. After scanning for donor signals, repeater system 100 may select an azimuth angle for positioning donor antenna(s) to receive donor signal, based on signal strength, donor site separation, antenna isolation, and/or data throughput of the donor signal, as described in further detail herein. Accordingly, embodiments of the repeater system 100 may be configured to boost donor signals from the selected source, which may improve cellular service in an area that may otherwise normally have poor or no cellular service due to remoteness, or boost and repeat a signal indoors to avoid attenuation of a signal caused by building materials.

In some embodiments, the repeater system 100 may be controlled by a computing device such as micro-controller 120 implementing a Linux based high level programing language, and using various suitable communication protocols between components. It may be contemplated that other types of operating systems or programming languages may be used.

One or more components of repeater system 100 may include internal RF shielding to avoid component interference and may be outdoor rated for working environments between −40° C. to +50° C.

Rotating equipment 101 may include the one or more donor antennas, such as a voice antenna 102 for voice services and a data antenna 104 for data services. The donor antenna circuit may be coupled to a rotator 106. In some embodiments, a cell modem 108 may be coupled via a coaxial transmission line to the data antenna 104.

In some embodiments, rotating equipment 101 is located in a suitable location, such as adjacent a top of a tower or drilling rig derrick, such that the donor antenna circuit may receive donor signals from a source antenna (e.g., nearby, surrounding cellular towers).

Embodiments of donor antenna circuits may include one or more directional antennas configured to be rotated and directed about positions represented by azimuth angles corresponding to source signals. Source signals may originate from cell towers. By positioning the donor antenna circuits directionally to interface with a surrounding cellular tower, the rotator may be configured to identify a source for receiving radio frequency (RF) signals.

In some embodiments, RF signals may include, LTE and 3G standard technologies used for either voice or data in bands such as Band 12/13/17/29 (700 MHz), Band 5 (850 MHz), Band 2 (1900 MHz), Band 4 (2100 MHz), or Band 7 (2600 MHz). Other frequency bands and/or bandwidths may be used.

"Donor antenna(s)" or donor antenna circuits may refer to one or both of a voice antenna or a data antenna, as described herein. In some embodiments, a voice signal and data signal may received by a donor antenna circuit.

A donor antenna can include an antenna for voice services such as voice antenna 102 to receive a voice component of a donor signal. Voice signal received by voice antenna 102 can be the signal that the analysis of repeater system 100 is performed on.

A donor antenna can include an antenna for data services such as data antenna 104 to receive data, for example, a Long-Term Evolution (LTE) wireless broadband standard signal, from a source.

In some embodiments, voice antenna 102 and data antenna 104 are coupled to an actuator such as rotator 106. Rotator 106 can include a motor and can move and control voice antenna 102 and data antenna 104.

Rotator 106 be can be configured to rotate voice antenna 102 and data antenna 104 horizontally, to azimuth angles about 360 degrees of rotation and may rotate in increments such as every 10 degrees. Other increments of rotation about an axis may be used.

In some embodiments, rotator 106 may move voice antenna 102 and data antenna 104 vertically relative to the rotator 106 to a desired elevation or height.

In some embodiments, the voice antenna 102 and the data antenna 104 may be mounted to the rotator 106, such that the rotator 106 is configured to orient the voice antenna 102 and the data antenna 104 as a substantially unitary unit in a substantially similar direction. In the present example, the rotator 106 may orient the respective antennas as a substantially unitary unit in situations where it may be beneficial to rotate the voice antenna 102 and the data antenna 104 to a similar azimuth angle position about a rotation axis of the rotator unit 106.

In some scenarios, positioning models described in the present disclosure may generate target antenna positions such that it may be beneficial to position the voice antenna 102 and the data antenna 104 at different azimuth angle positions about the rotation axis of the rotator unit 106. In the present example, the rotator 106 may be configured to orient the voice antenna 102 or the data antenna 104 independently of the other antenna.

Rotator 106 can be connected to a rotator controller 116 with a suitable communication link. Rotator controller 116 controls rotator 106, and is connected to micro-controller 120 by way of Universal Serial Bus ("USB") or a suitable communication link, and receives control instructions from micro-controller 120.

Cell modem 108 may be coupled or in communication with data antenna 104, for example, by way of a coaxial cable or other suitable communication link, to convert data signal received by data antenna 104 into a suitable signal for use by repeater system 100 and transmission to a point-to-point ("P2P") wireless bridge 150. The data signal is transmitted to P2P wireless bridge 150 by way of an Ethernet communication link or other suitable communication link through Ethernet switch 118.

Electric power may be delivered to cell modem 108 by way of power over Ethernet ("POE") injector I connected to a suitable power supply to provide Ethernet with POE. As shown in FIG. 1, another POE injector 111 can similarly deliver power to P2P wireless bridge 150.

Data signal from cell modem 108 can be transmitted to micro-controller 120 by way of a network switch such as Ethernet switch 118, in communication with micro-controller 120 by way of Ethernet or other suitable communication link.

P2P wireless bridge 150 can allow for wireless connection to wireless access points, in an example, to facilitate internet connection over a wireless network.

Controller/booster 110 may include a spectrum analyzer 114 configured to measure features of an input signal, such as the received signal strength indicator ("RSSI") of a donor signal coming into repeater system 100. In some embodiments, the micro-controller 120 may be configured to collect data and perform processing, such as calculating data throughput or speed, donor site separation, and determining antenna isolation between donor antennas, such as voice antenna 102, and service antennas, such as AF antennas 160.

Based on the collected data, system 100 may move the donor antenna(s), including voice antenna 102 and data antenna 104, to a selected donor antenna azimuth position, and boost and repeat the cell service in downlink, as well as boost and repeat signals in uplink.

In some embodiments, system 100 may auto adjust the uplink ("UL") and downlink ("DL") gain levels, in an example, up to 100 dB, without going into oscillation or harming the source of the donor signal.

Repeater system 100 may include input pushbuttons, such as a "Search" or "Find" button located on controller/booster 110, illustrated in FIG. 1 as "Find" input 123A, which may be used to activate repeater system 100.

In some embodiments, controller/booster may be physically located at a convenient location, typically at the base of a tower or a drilling rig derrick, and may include cell repeater functionality and processing and control capability to control rotating equipment 101.

As illustrated in FIG. 1, controller/booster 110 includes a donor RF switch 112 configured to receive signals, such as a donor signal, from the voice antenna 102, and based on a 12 V switching signal generated by micro-controller 120 and received via a switching board 122, sending the signal to spectrum analyzer 114 or a splitter/combiner 113A. Donor RF switch 112 may be connected to voice antenna 102, spectrum analyzer 114, and splitter/combiner 113A by a coaxial cable or other suitable communication link.

Controller/booster 110 also includes a spectrum analyzer 114 connected to micro-controller 120 with a Universal Asynchronous Receiver/Transmitter ("UART").

Spectrum analyzer 114 is configured to measure signals such as donor signal from voice antenna 102 by way of donor RF switch 112, including measuring RSSI and communicating measurement values to micro-controller 120.

In some embodiments, another spectrum analyzer, which can be similar in structure and components to spectrum analyzer 114, may be built into a kit (not shown) that can be located within a repeated service area to measure repeated service provided by service antennas such as AF antennas 160. This kit can be linked back to controller/booster 110 via a peer-to-peer commutation link, and could be viewed through an integrated web server.

Micro-controller 120 may be a computing device to perform processing, and in some embodiments, is connected to a display such as display 121. Embodiments of a computing device is described in further detail below, with reference to FIG. 2.

Micro-controller 120, in combination with other components of repeater system 100, may be configured to rotate the donor antenna(s) to search for input donor signals, and measure, for each donor signal at an azimuth angle, criteria including received signal strength indicator ("RSSI"), donor site separation, data throughput or speed, and antenna isolation between donor antennas and service antennas.

Based on measured variables such as RSSI, donor site separation, data throughput, and antenna isolation, micro-controller 120 may be configured to identify a selection of one or more azimuth angles, or a ranked list of "best" donor options, at which a desired donor signal can be received to repeat. As will be disclosed herein, in some embodiments, the signal repeater system 100 may be configured to select azimuth angle(s) corresponding to donor antenna position relative to donor sites (e.g., surrounding cellular towers) for maximizing data throughput and repeated signal strength, rather than relying solely on signal strength as criteria for selecting donor antenna circuit position (e.g., select a donor antenna/cellular tower option).

In evaluating donor options, based on donor signals received at various azimuth angles, signal strength may be a criteria evaluated. In some embodiments, signal strength may need to meet a minimum threshold to be considered a viable option. Peaks in signal strength indicate where donor sites (sources) are located.

In selecting an azimuth angle directed to a donor site, a donor site separation criteria may be evaluated to ensure that a donor site is not selected that is too close to another donor site. In some embodiments, the azimuth angle of selected donor options must be a minimum of 40 degrees apart.

Other factors may be evaluated in a weighted algorithm to select the optimal antenna azimuth angle to receive from sources. In some embodiments, RSSI and UL speed tests of an incoming donor signal are weighted the highest. In some embodiments, a higher RSSI value may be easier to repeat and may be more reliable.

In some situations, UL speeds may reflect the quality of a connection back to the source. Relatively poor uplink speed metrics may lead to degraded signal repeater performance. In some embodiments, the greater the UL speed, the better the connection back to the source may be. Evaluating UL speeds may help to eliminate signals that are not direct line of site but are instead reflections (for example, off mountains/buildings) which can have weak UL speeds.

In some embodiments, signal repeater systems described herein may be configured to evaluate DL speeds or antenna isolation performance.

As will be described using examples herein, Various criteria in azimuth angle selection may be balanced or weighted, as reflected in the graphs illustrated in FIGS. 5-8, and discussed in further detail below.

In some embodiments, it may not be desirable to select an azimuth angle option that scores poorly in one or two criteria categories, even if RSSI and UL values are high. Instead, an azimuth angle for the donor antenna may be selected to try to achieve mid-range values or scores across many or all criteria.

In some embodiments, RSSI and UL speed tests may be rated and valued higher than DL speed tests and antenna isolation in selecting optimal azimuth angles.

An azimuth angle may be evaluated based on where measured criteria levels fall on the curves of FIGS. 5-8 to determine a point score. In some embodiments, scoring curves may resemble CS' curves, such that at a certain value, diminishing returns may be reached and points attributed to a score increase at a slower rate as the criteria value increases. In another example, at a low end of criteria values, below a certain value the points plateau and decrease at a slower rate. In this way, it may be possible to achieve an optimal mix of variables without one criteria swaying the total score too heavily. The "knees" of the curves can represent where that specific criteria moves from "poor" to "ok" and then again "good" to "great".

Micro-controller 120 may have installed a configurable settings file to fine tune software and algorithms without needing a change in firmware.

Micro-controller 120 may include non-volatile memory for storing search parameters to search for a donor site or source, thus may allow for seamless operation of repeater system 100 after a power loss, as previous search parameters stored in non-volatile memory will not change if the power supply is interrupted.

Micro-controller 120 may also include a processor capable of multi-threading, allowing software to run multiple functions simultaneously.

In some embodiments, micro-controller 120 may be configured to automatically detect hardware failures and display error codes on a display such as display 121 to assist in troubleshooting.

Hardware failures can be detected by micro-controller 120 by attempting to establish communication with other hardware components during a power on self-test (POST), for example, by pinging cell modem 108 and detecting a response, checking that spectrum analyzer 114 responds over the UART, or other tests.

Figure 4A:
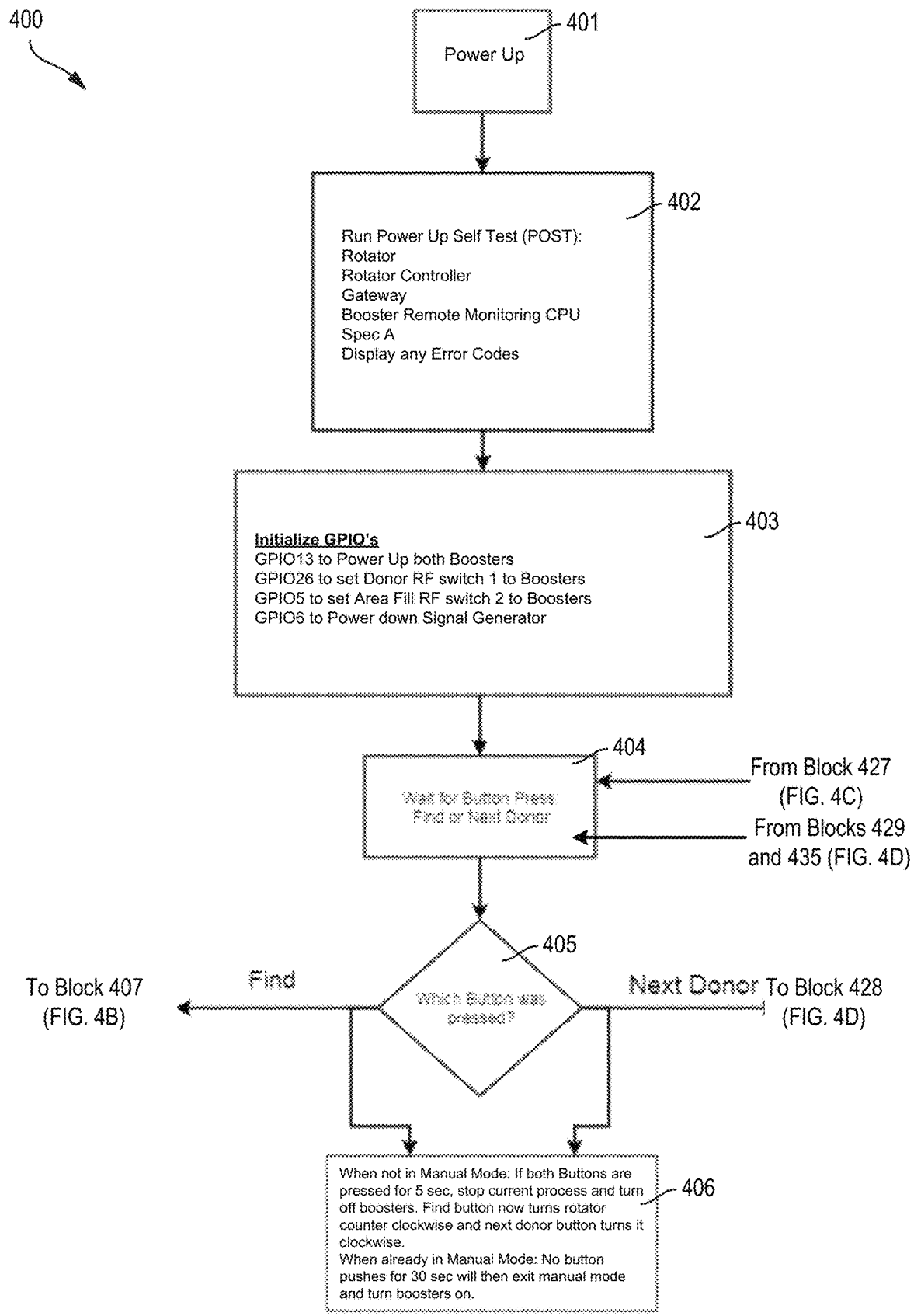
FIGS. 4A to 4D is a flow chart of a method for operating a repeater system, according to an embodiment.
Figure 4B:
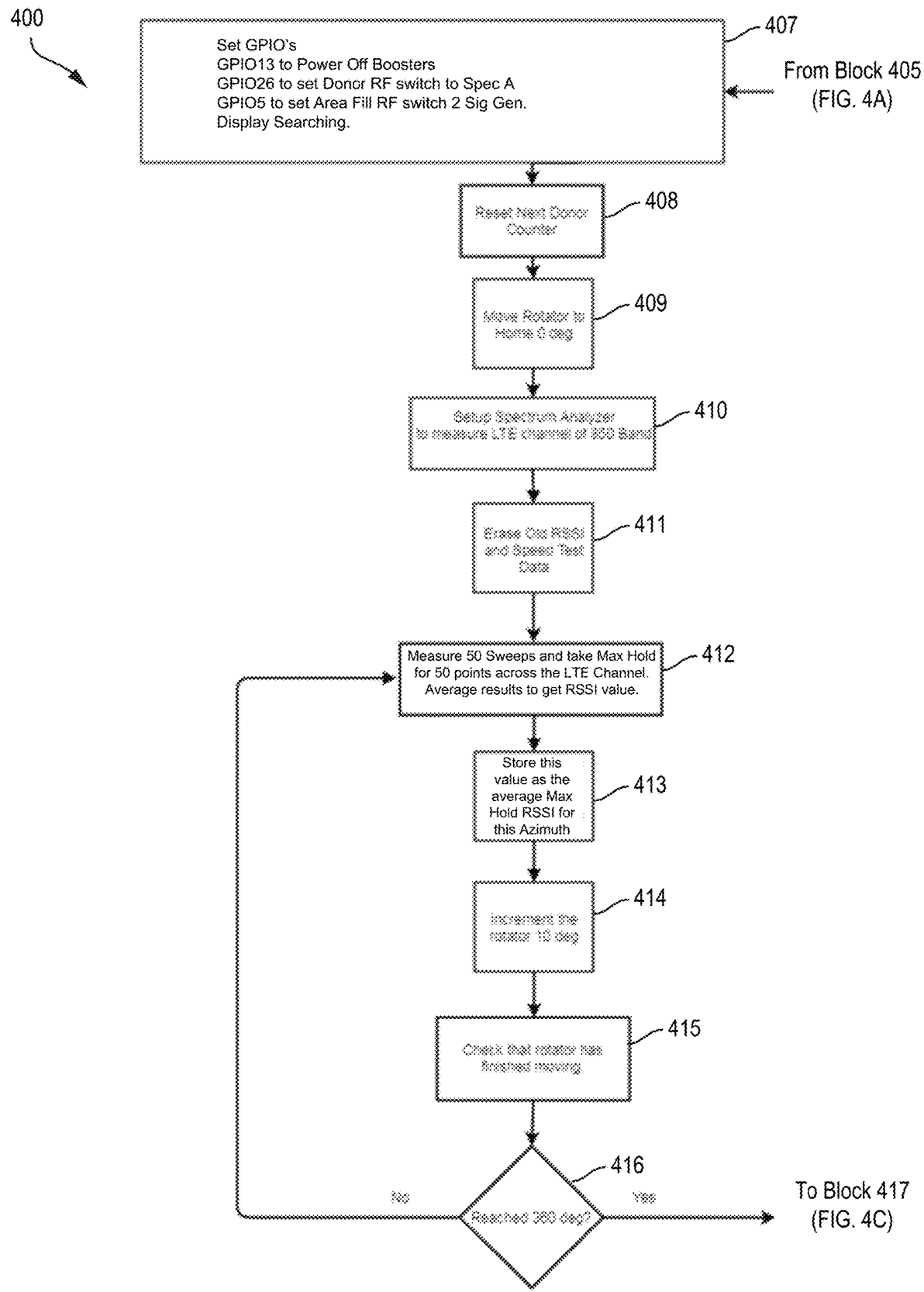

During operation, such as a "Find" sequence initiated at block 407 as illustrated in FIG. 4B and described below, potential errors can be detected by lack of receiving signal. In an example, if no RSSI is measured anywhere in 360 degrees of rotation of voice antenna 102, micro-controller 120 may flag a condition that voice antenna 102 is not connected, or generate a warning indicating that there are no donor sites above the selected minimum threshold. Similarly, during isolation testing, if a signal generated by signal generator 140 is not measured, a status may be set that signal generator 140 is not operational, or it may be logged as a warning since not measuring the signal may be desirable.

In some embodiments, integrated location detection, such as by using GPS coordinates obtained using a GPS device (not shown) or another suitable location detection technique, may be utilized to assist in troubleshooting potential line of site issues, inventory tracking, and field tech dispatching.

Other features of micro-controller 120 may include the ability to move to the next "best" donor option or a donor azimuth selection without the need of performing another full search, a manual mode operation to allow a user to either fine tune the system or bypass the auto search feature and manually sweep donor antenna azimuth angles, and a POST test feature to tell the user if all components are functional before the search begins.

In some embodiments, artificial intelligence or machine learning techniques may be implemented to fine-tune an algorithm for selecting a donor azimuth angle option, in an example, by learning which donor options a user selects as their favorite options. By examining what the algorithm determines as the selected azimuth, and the trend of what users are choosing, for example, by using the "Next Donor Option" as discussed with reference to FIGS. 4A-4D, below, the system may learn and adjust the algorithm automatically.

In some embodiments, repeater system 100 may include an integrated web server with remote portal to log into system, such as micro-controller 120, to perform actions and view results such as spectrum analysis.

In some embodiments, micro-controller 120 may be in communication with a mobile computing device that has, in an example, an application to view spectral data or other relevant information relating to repeater system 100, and is capable of allowing a user to peak the donor antenna manually using the mobile computing device as the monitor and controls. Such functionality may be connected via local Wi-Fi connection and tied into an integrated web server. Peaking the donor antenna, such as voice antenna 102, manually can include moving the donor antenna clockwise and counterclockwise to find the highest RSSI (receive signal strength indicator), thus using RSSI to point the antenna directly at the donor site.

Switching board 122 may be connected to micro-controller 120 with a 3.3 V power connection and a communication link to set general-purpose inputs/outputs ("GPIOs").

Switching board 122 includes GPIOs controlled by micro-controller 120 to set, using a 12 V signal, switches, including donor RF switch 112, area-fill RF switch 115, boosters 130A, 130B by way of a relay 124, and signal generator 140 by way of a relay 124.

Inputs 123A, 123B may be button inputs or other suitable type of input, and connected to switching board 122, in an example, using a 3.3 V signal.

Input 123A may initiate action for "Find", and input 123B initiates action for "Next Donor" as illustrated, in an example, at block 404 in FIG. 4A.

As shown in FIGS. 4A-4D illustrating a method 400, repeater system 100 may be activated by a single find button such as input 123A, which may make it simple to operate, and may not require a technician to go to site.

Booster 130A ("Booster 1") and Booster 130B ("Booster 2") may be signal amplifiers, in an example, bi-directional signal amplifiers, operating on various frequency bands to amplify the signal (in some embodiment, in both uplink and downlink directions), providing a power gain to the signal. Boosters 130A, 130B may be powered on or off by switching board 122 by way of a relay 124.

Boosters 130A and 130B may receive a donor signal from donor RF switch 112 that is split by splitter/combiner 113A into multiple (in an example, two) bands, connected by a coaxial cable or other suitable communication link. In some embodiments, the amount of coaxial cable between the donor antenna (voice antenna 102) and boosters 130A, 130B may be reduced.

A booster remote monitoring CPU (not explicitly illustrated in FIG. 1) may be connected to boosters 130A, 130B to modify boosters 130A, 130B, such as to change bands, for example, to change the bands being boosted or amplified based on the frequency band being received at voice antenna 102.

In some embodiments, boosters 130A, 130B may be configured to automatically adjust gain based at least in part on measured donor RSSI and antenna isolation, which may ensure that no oscillation or interference is caused by power gain.

Another splitter/combiner 113B may combine the boosted signals from boosters 130A, 130B, and may transmit the combined signal to area-fill RF switch 115.

Signal generator 140 ("Sig Gen") may be a signal generator for use during antenna isolation testing, and may be powered on or off by a signal from micro-controller 120 by way of switching board 122 and a relay 124. Signal generator 140 outputs a generated signal to area-fill RF switch 115, connected by way of a coaxial cable or suitable communication link.

In some embodiments, the signal generator 140 may generate and output a signal with a frequency of 894 MHz and an amplitude of +1 dBm.

In use, signal generator 140 may transmit a signal out through AF antennas 160 by way of area-fill RF switch 115 and splitter 117. To perform an antenna isolation test for donor antenna(s) at a particular azimuth angle, spectrum analyzer 114 may configured to try to measure the generated signal from signal generator 140 to determine antenna isolation.

In the event of antenna isolation, ideally there is no signal to measure over the air from signal generator 140. If a signal is measured, an antenna isolation test score may be negatively impacted, and negatively affect the score of a total score for that particular azimuth angle being tested. In particular, a score for an azimuth angle may be negatively impacted if the measured isolation is less than what is required for the booster to reach its maximum gain.

Area-fill RF switch 115 may be a switch, activated by a 12 V signal from switching board 122 generated by micro-controller 120, to direct signal to splitter 117 to split or divide signal so that it can be output by multiple area-fill antennas 160, which can be directional to cover more area with the output signal. Area-fill RF switch 115 may be connected to boosters 130A, 130B by way of splitter/combiner 1136 with coaxial cable or suitable communication link, to receive a boosted signal from boosters 130A, 130B that have been combined by splitter/combiner 1136. Area-fill RF switch 115 is connected to signal generator 140 by coaxial cable, or suitable communication link, to receive a generated signal.

AF antennas 160, or service, fill, or rebroadcast antennas, rebroadcast a boosted or amplified signal originally received at voice antenna 102, over a repeated service area. In some embodiments, AF antennas 160 may receive signals in a service area, for example, signals from local mobile devices such as cell phones, for boosting and repeating using techniques disclosed herein, and transmitted by voice antenna 102 to a donor or source antenna such as a surrounding cell tower.

AF antennas 160 may be directional or omnidirectional antenna(s) for rebroadcasting or receiving signals. In some situations, it may be beneficial to improve signal metrics such as antenna isolation performance. Thus, in some embodiments, the AF antennas 160 may include one or more directional antennas.

In some embodiments, one or more AF antennas 160 may be movable and/or rotatable, for example, coupled to a rotator or motorized. AF antennas 160 can then be aligned to point at desired locations (for example, office trailers).

Micro-controller 120 can be configured to determine a direction to direct AF antennas 160 based on a weighted algorithm to balance pointing AF antennas 160 at desired locations with measured antenna isolation.

Directionality of AF antennas 160 can be implemented by using an RF switch that is connected to spectrum analyzer 114 and AF antennas 160. Signal generators can be placed in desired locations (such as office trailers) with external omnidirectional antennas that transmit a signal on a specific frequency that spectrum analyzer 114 measures and peaks on.

For wide areas of coverage requiring more than one AF antenna 160, a second signal generator may be placed at a far end of the desired area and transmit a different frequency. Micro-controller 120 can be configured to move a first AF antenna 160 to peak on the first frequency and a second AF antenna 160 to peak on second frequency using the same rotator/controller as the donor antenna (such as voice antenna 102) uses.

Signal generators located at a desired location could be turned on or off remotely though a local network, such as over Wi-Fi, by micro-controller 120.

Figure 2:
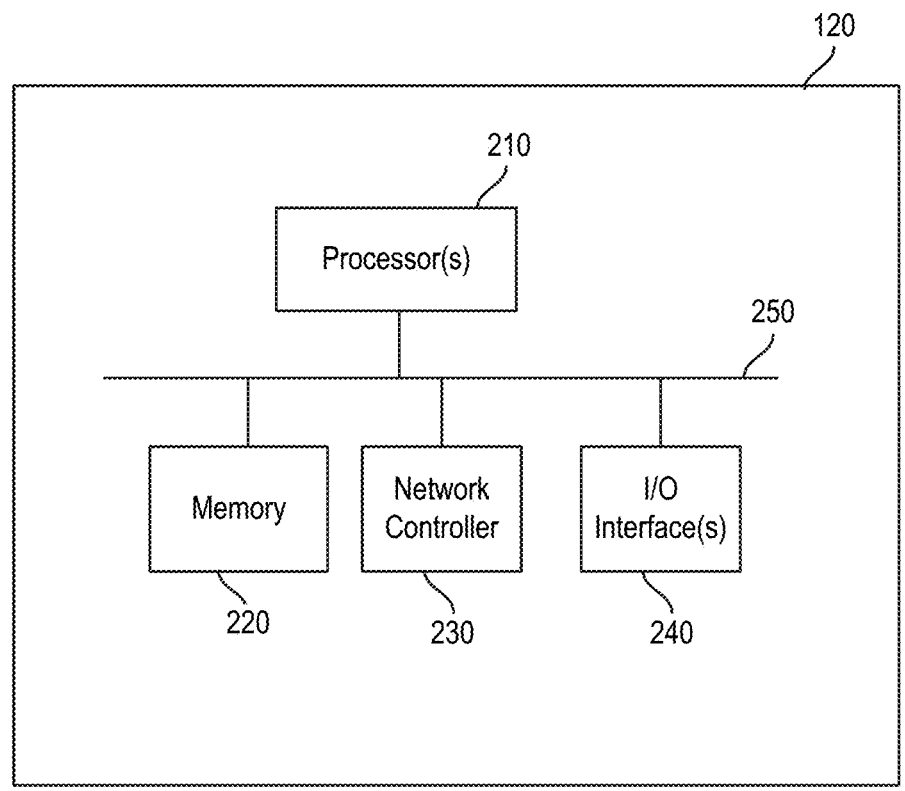
FIG. 2 is a high-level block diagram of a computing device, according to an embodiment.

FIG. 2 illustrates a high-level block diagram of a computing device, exemplary of a micro-controller 120, in accordance with embodiments of the present disclosure. In some embodiments, micro-controller 120, under software control can rotate donor antenna(s) to scan for donor signal, and select an azimuth angle for the donor antenna(s) based on characteristics including signal strength, donor site separation, data throughput, and antenna isolation.

Micro-controller 120 can be any suitable computing device, or a microcontroller such as an Arduino and associated software system. In some embodiments, micro-controller 120 may be a Raspberry Pi computer or controller.

In some embodiments, micro-controller 120, a computing device, includes one or more processors 210, memory 220, a network controller 230 and one or more I/O interfaces 240 in communication over bus 250.

Processor(s) 210 may be one or more Intel x86, Intel x64, AMD x86-64, PowerPC, ARM processors or the like. Processor(s) 210 may be, for example, any type of general-purpose microprocessor, a digital signal processing (DSP) processor, an integrated circuit, a field programmable gate array (FPGA), a reconfigurable processor, or any combination thereof.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, such as display 121, and the like. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Figure 3:
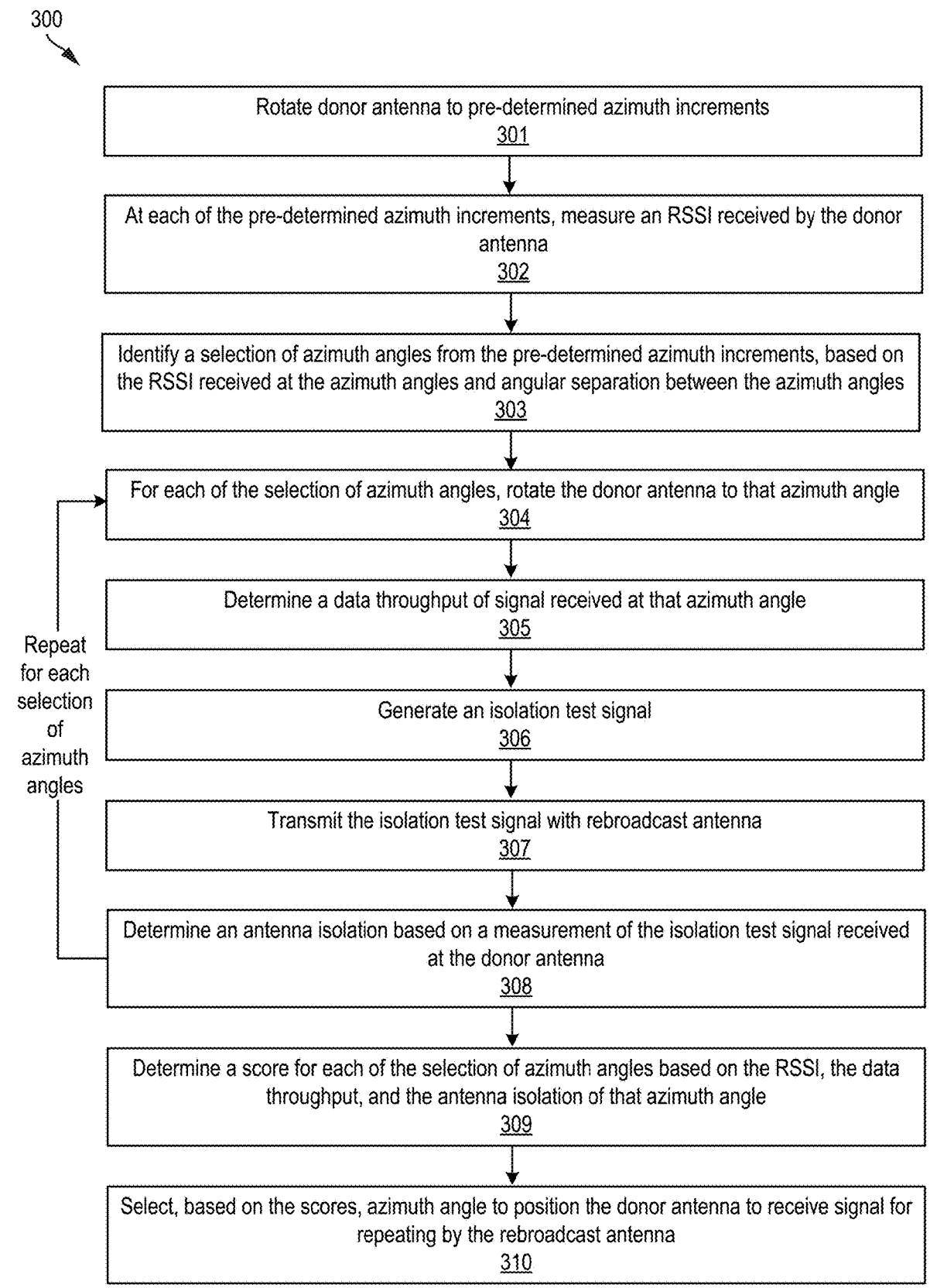
FIG. 3 is a flow chart of a method for selecting an azimuth angle to position a donor antenna to receive signal for repeating, according to an embodiment.

FIG. 3 illustrates a flowchart of a method 300 for selecting an azimuth angle to position a donor antenna to receive signal for repeating or transmitting a repeated signal, in accordance with embodiments of the present disclosure. One or more operations of method 300 may be performed by components of system 100 (FIG. 1). The blocks are provided for illustrative purposes. Variations of the blocks, omission or substitution of various blocks, or additional blocks may be considered. One or more of the blocks may be performed in a different sequence or in an interleaved or iterative manner.

The location of surrounding source antennas, such as cell towers, may be unknown, along with the properties (such as technologies, capacities, signal strength and speed) of signals being transmitted from said sources.

At block 301, a rotator such as rotator 106 may rotate donor antenna(s) such as voice antenna 102 to pre-determined azimuth increments or angles, such as increments every 10 degrees for 360 degrees.

At block 302, at each of the pre-determined azimuth increments, spectrum analyzer 114 may be configured to measure an RSSI of an input donor signal received by the donor antenna.

Spectrum analyzer 114 measures donor signal strength, in an example, over an 850 MHz frequency band.

An RSSI value may be determined by spectrum analyzer 114 using a "Max Hold" technique, taking the average of sample points measured over a number of trace sweeps, in an example, fifty sample points over fifty sweeps. The sample points are the maximum readings for each point over the sweeps. Thus, the resulting RSSI value may not be affected by a single dip or spike of the measured frequency band. In some embodiments, the fifty points may be measured starting from 10% into an LTE channel and ending 10% before the end of the LTE channel.

In some embodiments, an RSSI value may be determined by measuring average or peak power of the donor signal.

An RSSI value for each pre-determined azimuth increment may be communicated to micro-controller 120.

At block 303, micro-controller 120 may identify a selection of azimuth angles from the pre-determined azimuth increments, based at least in part on the RSSI received and angular separation between the azimuth angles, or donor site separation.

When examining RSSI values from each donor antenna position, when the donor antenna moves to the next position the RSSI value may be strong, which may indicate a false donor option.

Thus, azimuth angles may be selected based on a minimum donor site separation, such that the donor antenna azimuth angle options are a minimum of between 10 and 50 degrees from each other, in an example, 30 degrees from each other, in another example, a minimum of 40 degrees from each other. The angular separation may be based on the donor antenna horizontal beam width, and may ensure that valid azimuth angle positions are selected by discarding false positives.

In some embodiments, a selection of ten azimuth angles are selected as the "best" donor options, or in other embodiments, a selection of five azimuth angles, or three azimuth angles.

In some embodiments, the selection of azimuth angles includes five azimuth angles with highest measured RSSI values and that are at least 40 degrees apart.

At block 304, for each of the selection of azimuth angles, the donor antenna(s), including both voice antenna 102 and data antenna 104, are rotated to that angle, such as by rotator 106 by way of rotator controller 116 receiving instructions from micro-controller 120.

At block 305, data throughput, or speed, is determined for a signal received at that azimuth angle.

In an example, a throughput test is performed by micro-controller 120 on data received at data antenna 104 and transmitted to micro-controller 120 by way of cell modem 108 and Ethernet switch 118.

In some embodiments, micro-controller 120 runs a suitable speed test for each of the selection of azimuth angles to confirm data throughput potential. Multiple tests may be run to improve accuracy. Speed tests may be conducted on both the downlink and the uplink independently, each having separate scoring.

In some embodiments, download and upload tests may be performed with micro-controller 120 in communication with a remote server accessible, for example, over the Internet. A download test can be performed by the server sending data to micro-controller 120 for a specified period of time and an upload test performed by micro-controller 120 sending data to the server for a specified period of time. Download and upload speeds may be computed by methods contained in the high level programming application stored on micro-controller 120 to determine the amount of data received or sent, respectively, over the designated periods of time.

At block 306, an isolation test signal may be generated, for example, by signal generator 140.

At block 307, the isolation test signal may be transmitted by a rebroadcast antenna such as one or more AF antennas 160.

At block 308, antenna isolation may be determined based on a measurement of the isolation test signal received at the donor antenna. Spectrum analyzer 114 may be set to detect at the parameters of the isolation test signal, and determine antenna isolation between the rebroadcast antenna and the donor antenna, sending the results of the antenna isolation test to micro-controller 120.

An antenna isolation test may be performed to determine if low repeater gain exists. It may be desirable to physically isolate the donor antenna from the rebroadcast antenna, both on the basis of azimuth and height.

If rebroadcast antenna(s) are not sufficiently isolated from the donor antenna, it is not possible to boost as much power (for example, by boosters such as boosters 130A, 130B) without causing oscillation. Specifically, if isolation is lower than actual gain plus a margin (of typically 5-15 dB), the repeater may go into oscillation. This oscillation can cause interference to the cellular network. Thus, the antenna isolation may be a criteria in selecting an azimuth angle to use for the donor antenna(s).

To determine antenna isolation, the transmit power of signal generator 140 may be calibrated to a known value (in an example, +1 dBm), and an incoming signal is measured at spectrum analyzer 114 (in an example, −90 dBm). The antenna isolation is the difference between the transmit power and the measured power (in an example, 91 dB of separation).

Blocks 304 to 308 may be repeated for each of the selection of azimuth angles.

At block 309, a score is determined for each of the selected azimuth angles, based at least in part on the RSSI, the data throughput, and the antenna isolation of that azimuth angle for the donor antenna. The score is determined, in an example, by micro-controller 120.

Scoring of an azimuth angle may be based on multiple criteria, to take into account RSSI, data throughput, antenna isolation, and donor site separation between potential donor azimuth angle options. Each of these criteria may be weighted differently in formulating a score. In some embodiments, the score for each azimuth angle is based on a weighting of one or more of the RSSI, the separation angle, the data throughput, and the antenna isolation of that azimuth angle.

In some embodiments, the overall score for an azimuth angle is based on the sum of all scores for each category. In some embodiments, azimuth angles are not selected that are less than 40 degrees apart of each other, which may avoid multiple options from a single donor site or source.

In an example, one of the concerns in selecting an azimuth angle may be that the best option may result in insufficient antenna isolation between the donor antenna (voice antenna 102) and the rebroadcast antennas (AF antennas 160). As such, the antenna isolation test is taken into consideration when selecting an azimuth angle, to reduce interference and maximize booster gain output.

In some embodiments, multiple azimuth angles can be selected, and may be ranked based on their scores, resulting in a first option, second option, third option, and so on. Selecting an azimuth angle for the donor antenna may include selecting a next ranked azimuth angle through the rankings. In some embodiments, selecting the azimuth angle to position the donor antenna to receive signal for repeating by the rebroadcast antenna may include selecting a next ranked azimuth angle. In an example, in a case where the first (highest) ranked option has undetected issues the rotator can be rotated to move the donor antenna to the next highest ranked option.

To determine a score for an azimuth angle, a measured value for each variable (RSSI, DL, UL speeds, antenna isolation) may be mapped to a point value on the scoring cures of the graphs of FIGS. 5-8.

In an example, an RSSI value could be −70 dBm for one donor azimuth angle option, and attribute 50 points to a score for that azimuth angle. A value of −88 dBm would provide 13 points.

Each variable or criteria is scored with points in a similar manner, using the appropriate scoring curve. The scores from each criteria are then summed to a total score.

In some embodiments, a maximum point score for an RSSI is 50, a maximum score for a DL speed is 30, a maximum score for an UL speed is 50, and isolation subtracts points if isolation needed to achieve max power is more than isolation measured, subtracting a maximum of 70 points from the total score.

At block 310, based at least in part on the scores determined at block 309, an azimuth angle is selected, for example, by micro-controller 120, to position the donor antenna, such as voice antenna 102 and data antenna 104, to receive signal for repeating by the rebroadcast antenna, such as AF antenna(s) 160.

The donor antenna, such as voice antenna 102 and data antenna 104, may be positioned to aim at the selected azimuth angle and a signal amplifier, such as boosters 130A, 130B, are activated to amplify a signal received at the donor antenna and for rebroadcasting at the rebroadcast antenna, such as AF antennas 160.

In some embodiments, the amount of power gain provided by boosters 130A, 130B is based at least in part on how great the isolation is between the donor antennas (such as voice antenna 102) and service antennas (such as AF antennas 160). Thus, system 100 may not harm donor towers with regards to UL power, and can auto attenuate the DL and UL gains which may ensure oscillation does not occur.

So as to not overpower a donor site or source with too strong of a signal, if the booster is close to a donor site, gain may be reduced, based on RSSI measured from the donor site.

Reference is made to FIGS. 4A-4D, which illustrate a method 400 for operating a repeater system such as system 100, in accordance with embodiments of the present disclosure. The blocks of method 400 illustrate actions of each component for functionality of system 100. The blocks are provided for illustrative purposes. Variations of the blocks, omission or substitution of various blocks, or additional blocks may be considered. It should be understood that one or more of the blocks may be performed in a different sequence or in an interleaved or iterative manner.

At block 401, system 100 and components thereof are powered up, for example, by user input.

At block 402, micro-controller 120 initiates a power up self test (POST) for rotator 106, rotator controller 116, cell modem 108 ("Gateway"), a booster remote monitoring CPU (not shown) connected to boosters 130A, 130B (in an example, via Bluetooth allowing changes to be made remotely to boosters 130A, 130B or to monitor their performance), spectrum analyzer 114, and any error codes are displayed.

At block 403, micro-controller 120 initializes general purpose input/outputs (GPIOs) within system 100, including GPIO13 to power up booster 130A and booster 130B, GPIO26 to set donor RF switch 112 (switch 1) to boosters (to booster 130A, 130B), GPIO5 to set area-fill RF switch 115 (switch 2) to boosters (to booster 130A, 130B), and GPIO6 to power down signal generator 140.

At block 404, system 100 is in standby, waiting for an input, such as button press, for "Find" or "Next Donor", illustrated in FIG. 1 as inputs 123A and 123B.

At block 405, micro-processor 120 evaluates if an input is received, for example, if a button such as input 123A or 123B was pressed, by way of switching board 122. If input 123A, "Find", is received, control flow proceeds to block 407 to select options for azimuth angles to position voice antenna 102 and data antenna 104 to receive signal for boosting by boosters 130A, 130B and repeating by AF antennas 160. If input 123B, "Next Donor" is received, control flow proceeds to block 428 to switch through a selection of donor azimuths, or "Next Donors".

In the event of either "Find" or "Next Donor" received, at block 406, and not in a manual mode, micro-controller 120 may be configured to evaluate whether both input 123A and 123B are pressed for 5 seconds, and if yes, current process is stopped and boosters 130A, 130B are turned off, and "Find" input turns rotator 106 counter-clockwise and "Next Donor" input turns rotator 106 clockwise. If in a manual mode, micro-controller 120 may be configured to evaluate if no button pushes are received for 30 seconds, and if yes, manual mode is exited and boosters 130A, 130B are turned on.

In some embodiments, features of next donor functionality may be provided to allow a user to move transition the donor antenna circuit to a next best donor tower (e.g., a cellular source tower from which target signal streams may be received and re-broadcast to a local region) that was identified by a series of FIND operations. Operations may include transitioning the donor antenna to successive 3 best donor towers. When the donor antenna circuit is oriented to a target orientation/position, operations may be configured to power on signal boosters.

In some embodiments, features of a stow feature (e.g., when depressing a next donor user interface/button for a predetermined amount of time) may orient the donor antenna circuit to a home or default position. The home or default position may be a donor antenna circuit orientation configured to allow transport of embodiments of the signal repeater circuit described herein.

In some embodiments, features of a manual mode (e.g., when depressing a find user interface/button and a next donor user interface/button simultaneously for a predetermined amount of time) may allow a user to manually configure the donor antenna circuit orientation, by rotating in a forward direction or an opposing direction. Operations may include exiting the manual mode upon expiry of a threshold time value.

Turning to FIG. 4B, at block 407, micro-controller 120 may be configured to set GPIOs, including GPIO13 to power off boosters 130A, 130B, GPIO26 to set donor RF switch 112 to spectrum analyzer 114 ("Spec A"), GPIO5 to set area-fill RF switch 115 (switch 2) to signal generator 140, and to display "Searching . . . ", for example, on display 121.

At block 408, micro-controller 120 may be configured to reset a "Next Donor" counter.

At block 409, micro-controller 120 may be configured to send instructions to rotator controller 116 to move rotator 106, and hence voice antenna 102 and data antenna 104, to a present azimuth angle, which begins at a "Home" location at zero degrees azimuth angle. In some embodiments, a "Home" or start location may be the most counter clockwise position of rotator 106, and not necessarily north.

At block 410, micro-controller 120 may be configured to send instructions to spectrum analyzer 114 to set up spectrum analyzer 114 to measure a channel within a frequency band, such as a Long Term Evolution (LTE) channel in the LTE 850 MHz frequency band.

At block 411, micro-controller 120 may be configured to erase or discard old RSSI and speed test data.

At block 412, micro-controller 120 may be configured to instruct spectrum analyzer 114 to measure RSSI values of an input signal at voice antenna 102, such as a donor signal, and the measured values are averaged. In an example, spectrum analyzer 114 performs 50 sweeps and measures "max hold" for 50 points across the LTE channel.

At block 413, spectrum analyzer 114 sends an average of the "max hold" values for the 50 points to micro-controller 120 and micro-controller 120 stores the average value as the max hold RSSI for the present azimuth angle.

At block 414, micro-controller 120 may be configured to instruct rotator controller 116 to rotate rotator 106, and hence voice antenna 102 and data antenna 104, in an azimuth angle increment, in an example, 10 degrees.

At block 415, micro-controller 120 may be configured to check that rotator 106 has finished moving.

At block 416, micro-controller 120 may be configured to evaluate whether rotator 106 has completed a rotation of 360 degrees azimuth. If no, control flow returns to block 412 to complete another RSSI measurement for the present azimuth angle. If yes, control flow proceeds to block 417.

Figure 4C:
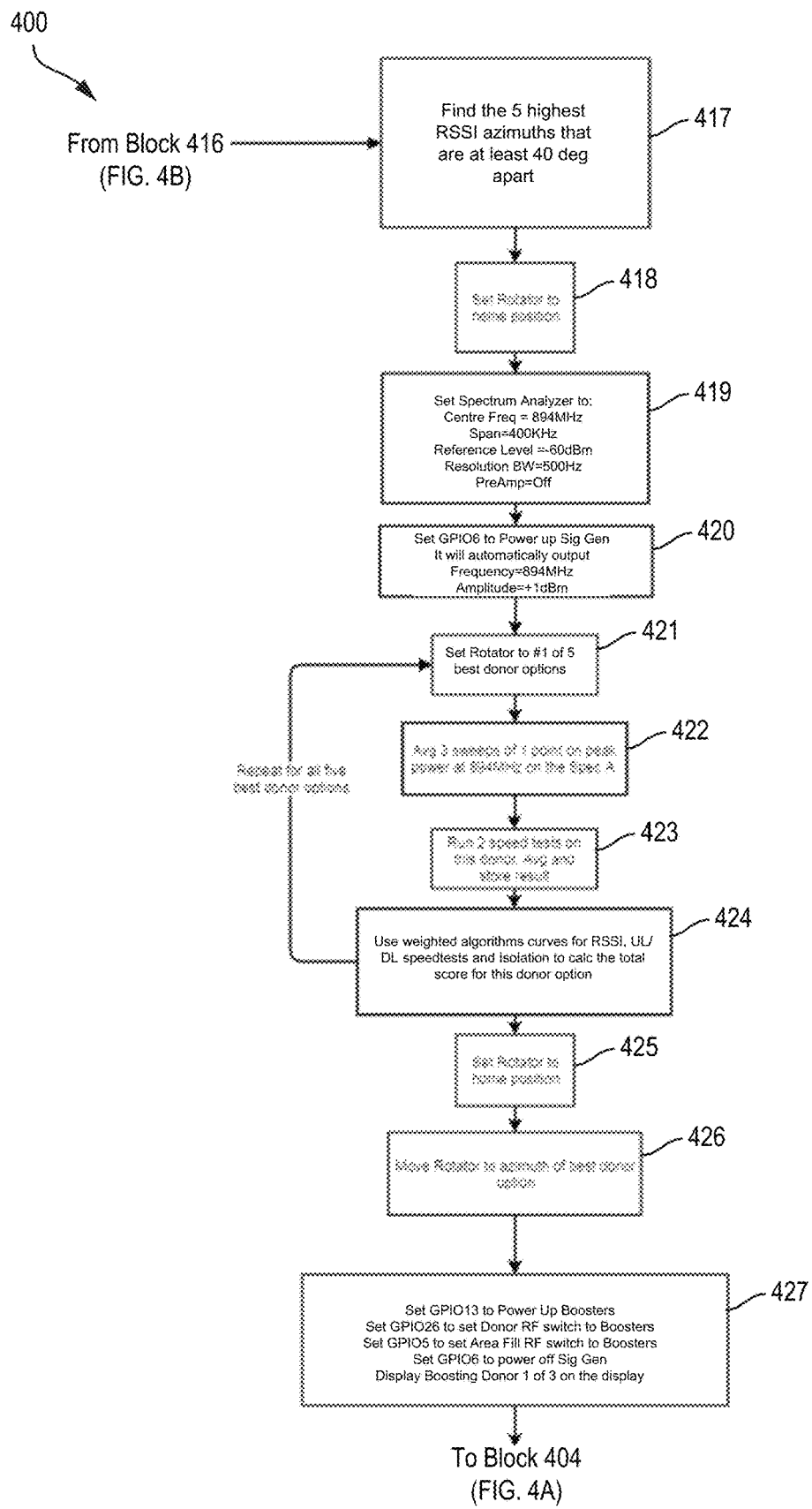

Turning to FIG. 4C, at block 417, micro-controller 120 may be configured to identify top donor options as azimuth angles with the highest corresponding RSSI values. In some embodiments, the selection of azimuths may be based at least in part on a donor site separation, such that the identified azimuth angles are at least a pre-defined number of degrees apart, for example, at least 30 degrees apart or at least 40 degrees apart. In some embodiments, a pre-defined number of azimuth angles may be selected, such as five azimuth angles having the highest RSSI values and that are at least 40 degrees apart.

At block 418, micro-controller 120 may be configured to instruct rotator controller 116 to set rotator 106 to a "Home" position.

At block 419, micro-controller 120 may be configured to set spectrum analyzer 114, in an example, to a centre frequency of 894 MHz, a span of 400 KHz, a reference level of −60 dBm, a resolution bandwidth of 500 Hz and preamp off or on.

At block 420, micro-controller 120 may be configured to set GPIO6 to power up signal generator 140, and signal generator 140 will automatically output a signal. In some embodiments, signal generator 140 may be configured to output a suitable signal, such as having a frequency of 894 MHz and amplitude of +1 dBm, or other suitable frequency and amplitude.

At block 421, micro-controller 120 may be configured to instruct rotator controller 116 to set rotator 106 to a first of the top donor options that have previously been identified on the basis of RSSI and peak donor separation.

At block 422, spectrum analyzer 114 may be configured to perform sweeps and measures peak power at a frequency matching that of signal generator 140 to perform an antenna isolation test. In an example, three sweeps are performed on peak power at 894 MHz, and the average of the three peak power points is determined as a measurement of the generated signal by spectrum analyzer 114.

At block 423, micro-controller 120 may be configured to run two speed tests for the current donor option (azimuth angle) on data received from data antenna 104 by way of cell modem 108 and through Ethernet switch 118 to micro-controller 120. In some embodiments, an average is taken of the two tests, and the result is stored as speed test. In some embodiments, separate upload and download speed tests are performed.

At block 424, micro-controller 120 may be configured to execute a weighted algorithm, based on scoring curves for the RSSI value, upload and download speed test values, and antenna isolation test values, as illustrated by way of example in FIGS. 5-8, to determine a total score for the present donor option (azimuth angle). Other suitable scoring curves may be used to evaluate the feasibility of an azimuth angle.

Scoring curves such as those shown in FIGS. 5-8 may be developed based on previously-performed manual setups and fine-tuned by testing in specific areas that exhibit different donor site scenarios.

A scoring curve may be developed with a defined "elbow point" at which for a particular criteria or variable, it is not desirable for the score to be lowered to dissuade the system from choosing that option. Similarly, there may be an acceptable point for the criteria or variable and it is not desirable to incentivize the system to increase a score too much when the value exceeds this acceptable level. This may have a moderating effect, such that one very good parameter does not cause the system to choose a donor option with potentially very poor other parameter(s).

Blocks 421 to 424 may be repeated for each of the top donor options, and begin with micro-controller 120 instructing rotator controller 116 to rotate rotator 106 to a next azimuth angle of the identified top donor options, to determine a total score for each of the top donor options. The donor options may be ranked based on value of total score, with a higher scoring indicating a more desirable or "best" donor option.

At block 425, micro-controller 120 may be configured to instruct rotator controller 116 to rotate rotator 106 to the "Home" position.

At block 426, micro-controller 120 may be configured to instruct rotator controller 116 to rotate rotator 106 to an azimuth angle of a selected or "best" donor option(s) identified based on the total scores for each donor option determined at block 424. For each donor option (for example, "top donors"), all four scores (RSSI, DL speed, UL speed, and isolation) are added up to give a total score for that donor option. The option with the highest score may be designated as the "best". The next highest score may be ranked as option two of three and the next highest ranked as option three of three.

At block 427, micro-controller 120 may be configured to set certain GPIOs, including set GPIO13 to power up boosters 130A, 130B, set GPIO26 to set donor RF switch 112 to boosters 130A, 130B, set GPIO5 to set area-fill RF switch 115 to boosters 130A, 130B, set GPIO6 to power off signal generator 140, as well as displays "Boosting Donor 1 of 3" on display 121. From block 427, control flow returns to block 404.

Figure 4D:
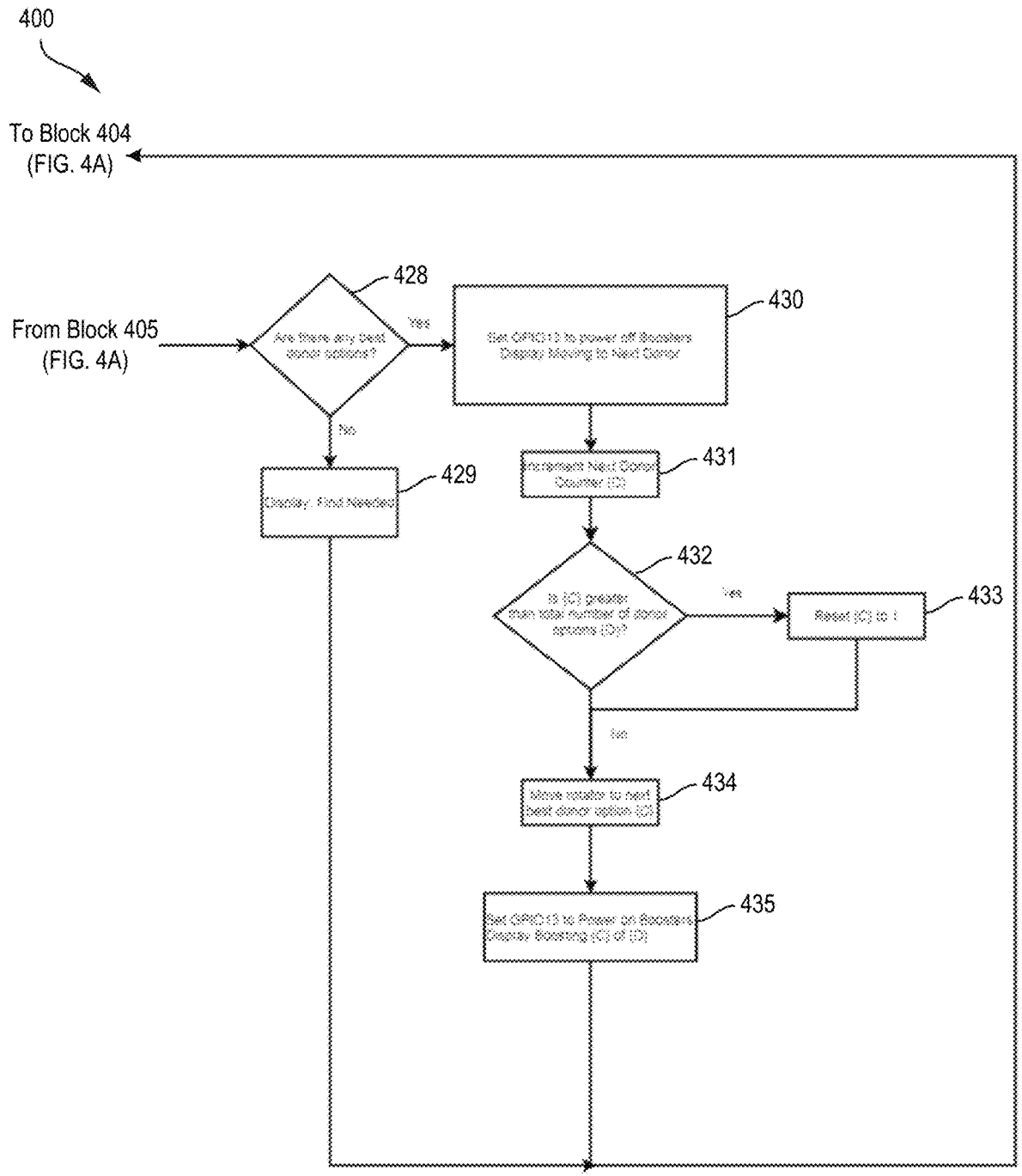

Turning to FIG. 4D, at block 428, micro-controller 120 may be configured to evaluate whether any donor option(s) have been selected (in an example, identified as "best"), such as based on the total scores for each donor option determined at block 424. If donor option(s) have not been selected, control flow proceeds to block 429 and micro-controller 120 displays "Find Needed" on display 121 and control flow returns to block 404. If donor option(s) have been selected, control flow proceeds to block 430.

At block 430, micro-controller 120 may be configured to set GPIO13 to power off boosters 130A, 130B and displays a suitable message such as "Changing Donor" or "Moving to Next Donor" on display 121.

At block 431, micro-controller 120 may be configured to increment a "Next Donor" counter, "C", representing the currently-selected donor option.

At block 432, micro-controller 120 may be configured to evaluate if the value of "C" is greater than a total number of donor options, "O". If the value "C" is greater than the value of "O", control flow proceeds to block 433, at which "C" is reset to a value of one, and control flow proceeds to block 434. If the value "C" is not greater than the value of "O", control flow proceeds to block 434.

In some embodiments, there are three total donor options, designated by "O". Other amounts of donor options are also contemplated, and the donor options can be based on a selection of top scoring donor options based on analysis performed in blocks 407 to 424.

At block 434, micro-controller 120 may be configured to instruct rotator controller 116 to rotate rotator 106 to the azimuth angle of the currently-selected donor option.

At block 435, micro-controller 120 may be configured to set GPIO13 to power on boosters 130A, 130B, and displays "Boosting Donor {C} of {O}" on display 121. Control returns to block 404.

FIGS. 5-8 are graphs illustrating values of points that can be attributed to an azimuth angle for a donor antenna, based on various criteria values, in particular, RSSI, download (DL) speed, upload (UL) speed, and isolation score. The points are totalled to a score for a donor option (at a particular azimuth angle). Thus FIGS. 5-8 illustrate how certain criteria may affect a score for each donor azimuth angle option.

Figure 5:
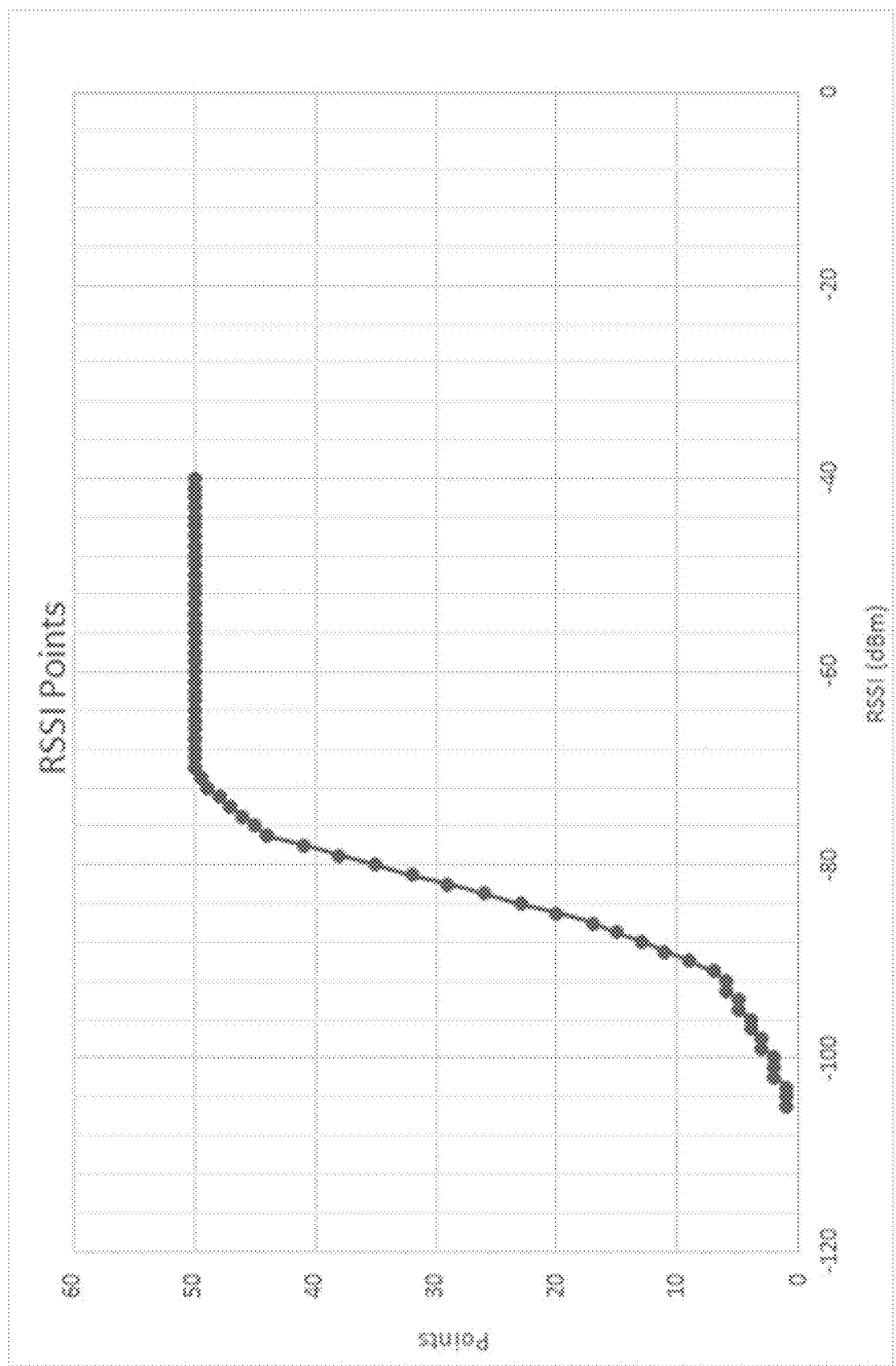
FIG. 5 is a graph illustrating a scoring curve of received signal strength indicator (RSSI) points, according to an embodiment.
Figure 6:
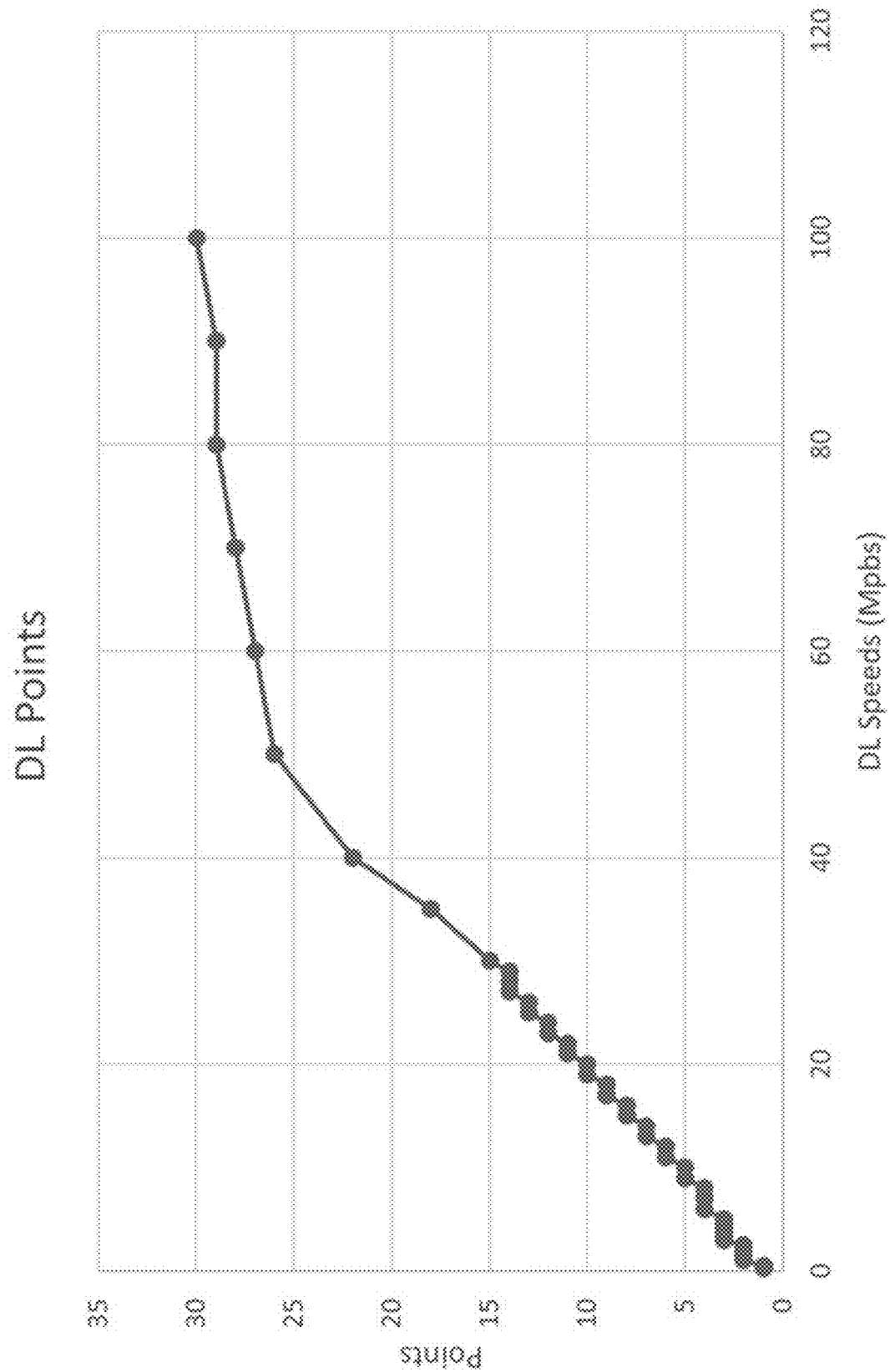
FIG. 6 is a graph illustrating a scoring curve of download (DL) points, according to an embodiment.
Figure 7:
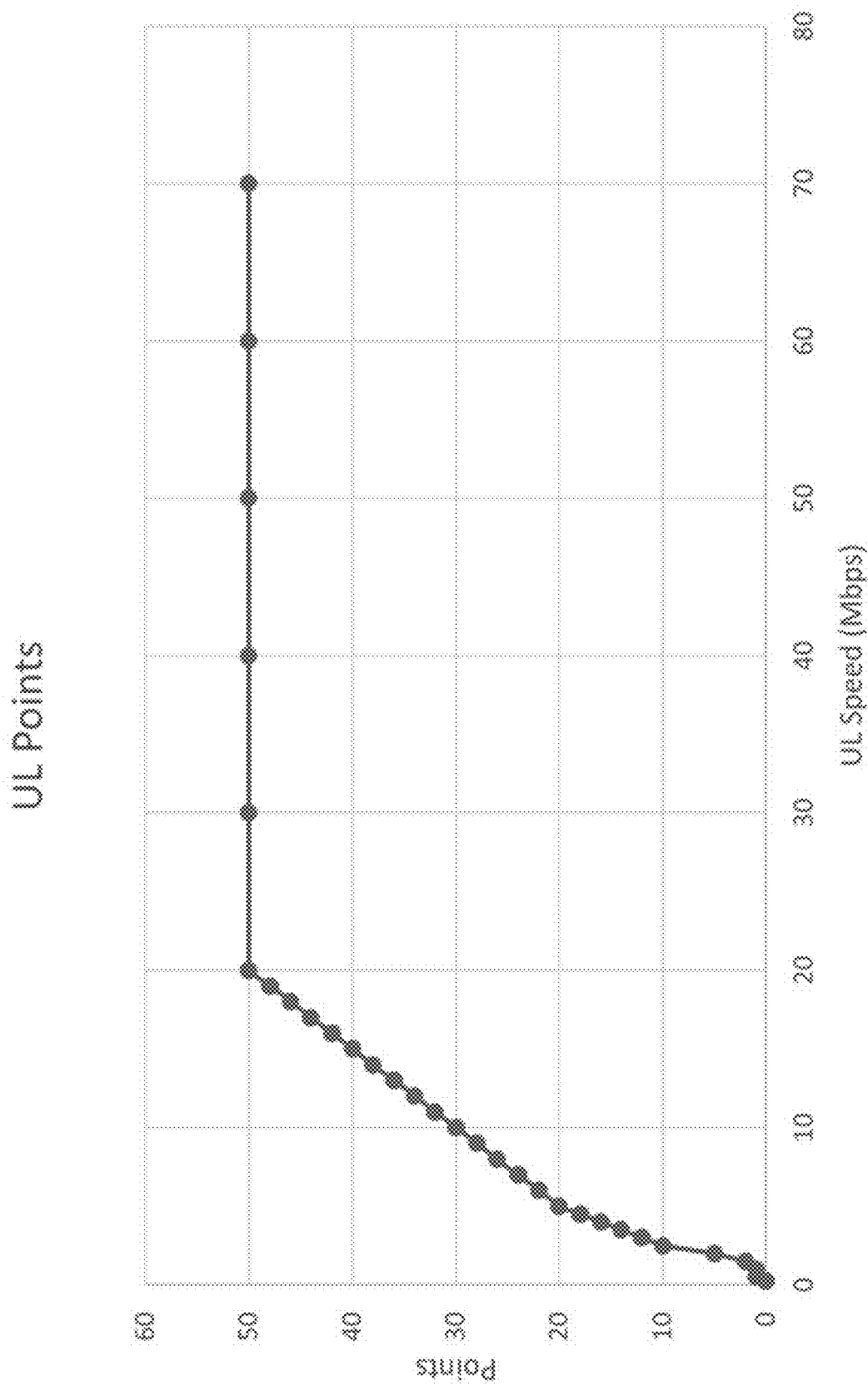
FIG. 7 is a graph illustrating a scoring curve of upload (UL) points, according to an embodiment.
Figure 8:
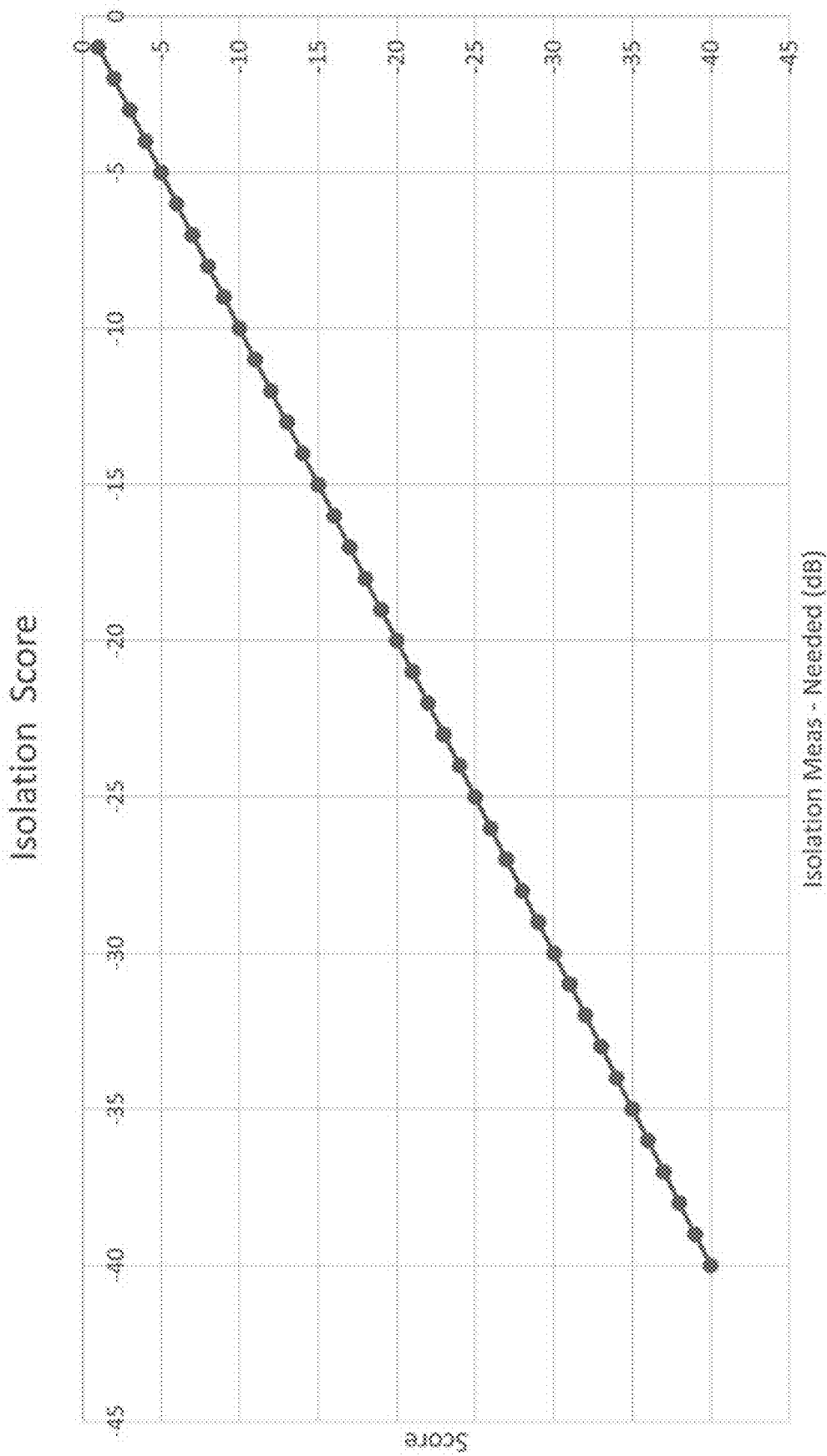
FIG. 8 is a graph illustrating a scoring curve of isolation scores, according to an embodiment.

The graphs of FIGS. 5-8 show scoring curves of each criteria that is weighted in attributing points in determining a score for an azimuth angle. A certain x-axis value will determine the y-value of points added to a score. FIG. 5 illustrates point values, shown on the y-axis, attributed based on a particular RSSI value, shown in dBm on the x-axis. FIG. 6 illustrates point values, shown on the y-axis, attributed based on a particular DL speed value, shown in Mpbs on the x-axis. FIG. 7 illustrates point values, shown on the y-axis, attributed based on a particular UL speed value, shown in Mbps on the x-axis. FIG. 8 illustrates point values, shown on the y-axis, attributed based on an isolation score, shown in dB on the x-axis.

The scoring curves of FIGS. 5-8 reflect example weighting for each criteria, namely the impact each criteria has (by way of points assigned) on the score. A higher weighted criteria will attribute more points, leading to a higher score and thus indicating desirability of a donor option azimuth angle.

In some embodiments, the criteria or variables that are most important are RSSI and UL speed test, which correspondingly result in a higher range of scores, whereas DL speed test values top out at a lower score. An isolation test result (isolation score) may only subtract from a score if there is less isolation than there is isolation needed, based on measurements, such as RSSI of a donor signal and signal generated by signal generator 140 received through voice antenna 102, and a calculation of an isolation score, as disclosed herein.

In some embodiments, an isolation score may be based on the following:

isolation score=measured isolation−needed isolation where "measured isolation" is the transmit power of a signal generated by signal generator 140 (in an example, +1 dBm)

minus the measurement of the generated signal by spectrum analyzer 114, through voice antenna 102; "needed isolation" is the maximum power of boosters 130A, 130B minus the RSSI of the donor signal.

An example use case for system and methods disclosed herein includes a rig application in oil and gas exploration and production, allowing for cellular signals at remote site locations to quickly and easily be optimized by automatically selecting azimuth angles to aim to a suitable cell tower and receive a donor signal for rebroadcasting at site.

Other applications include search and rescue command centres, wild fire fighting command centres and rural police or military command centres, or other examples of trailers that are mobilized to an unplanned or unknown area where fast and easy deployment of cellular voice and data communications may be needed.

Data vans (as control centres) for oil and gas fracking sites could also benefit from systems and methods disclosed herein, as they move from site to site frequently and need communications.

Systems and methods disclosed herein may allow for a donor antenna to align at an azimuth angle that provides an improved downlink donor signal and uplink signal, for example, on the basis of peak separation, signal strength and upload and/or download data throughput, while also improving boosting and repeating functionality by ensuring suitable antenna isolation.

Systems and methods disclosed herein can be configured to search for an optimal or best donor antenna azimuth, regardless of geographical area, without the need for predefined datasets (for example, without knowledge or data relating to a source or donor tower latitude and/or longitude).

The ability to pre-emptively or automatically search for azimuth angles may result in external cost savings due to less downtime for site applications, such as rig applications.

Internal cost savings may also be achieved due to less staffing required for site (or rig) moves, and less vehicle and travel costs for rig moves, since in a new move location, a suitable azimuth angle can be determined without the need for an operator to manually adjust the donor antenna and take readings.

Safety gains may also be achieved due to reduced travel, reduced work at height, and reduced work in weather conditions.

Efficiencies may also be gained as a result of less services requiring scheduling, the availability of remote connectivity and support, and accurate antenna peaking that does not rely on a compass that may give false readings.

Referring again to FIG. 1, the rotating equipment 101 may be coupled to the controller/booster 110 via one or a combination transmission line cables. In some embodiments, components of the rotating equipment 101 may be coupled to components of the controller/booster 110 based on one or a combination of Ethernet cable 192, coaxial cable 194, or power cable 196, a universal serial bus (USB) cable 197, or a control cable 198 (which may be any communication link providing control signals), among other examples.

In some situations, the rotating equipment 101 may be positioned several tens or hundreds of meters of distance from the controller/booster 110. When analog signals are transmitted via coaxial cable 194 over appreciable distances, analog signals may attenuate over the length of the coaxial cable 194. It may be beneficial to reduce lengths of coaxial cable 194 for coupling components at the rotating equipment 101 and at the controller/booster 110.

In some situations, routing communication transmission line cables may require specialized skill, such that such transmission line cables may not be damaged during installation. In some situations, damage to cables caused by environmental factors may require that such cables be replaced. It may be beneficial to reduce the quantity of transmission line cables coupling components of the rotating equipment 101 and the controller booster 110.

Figure 9:
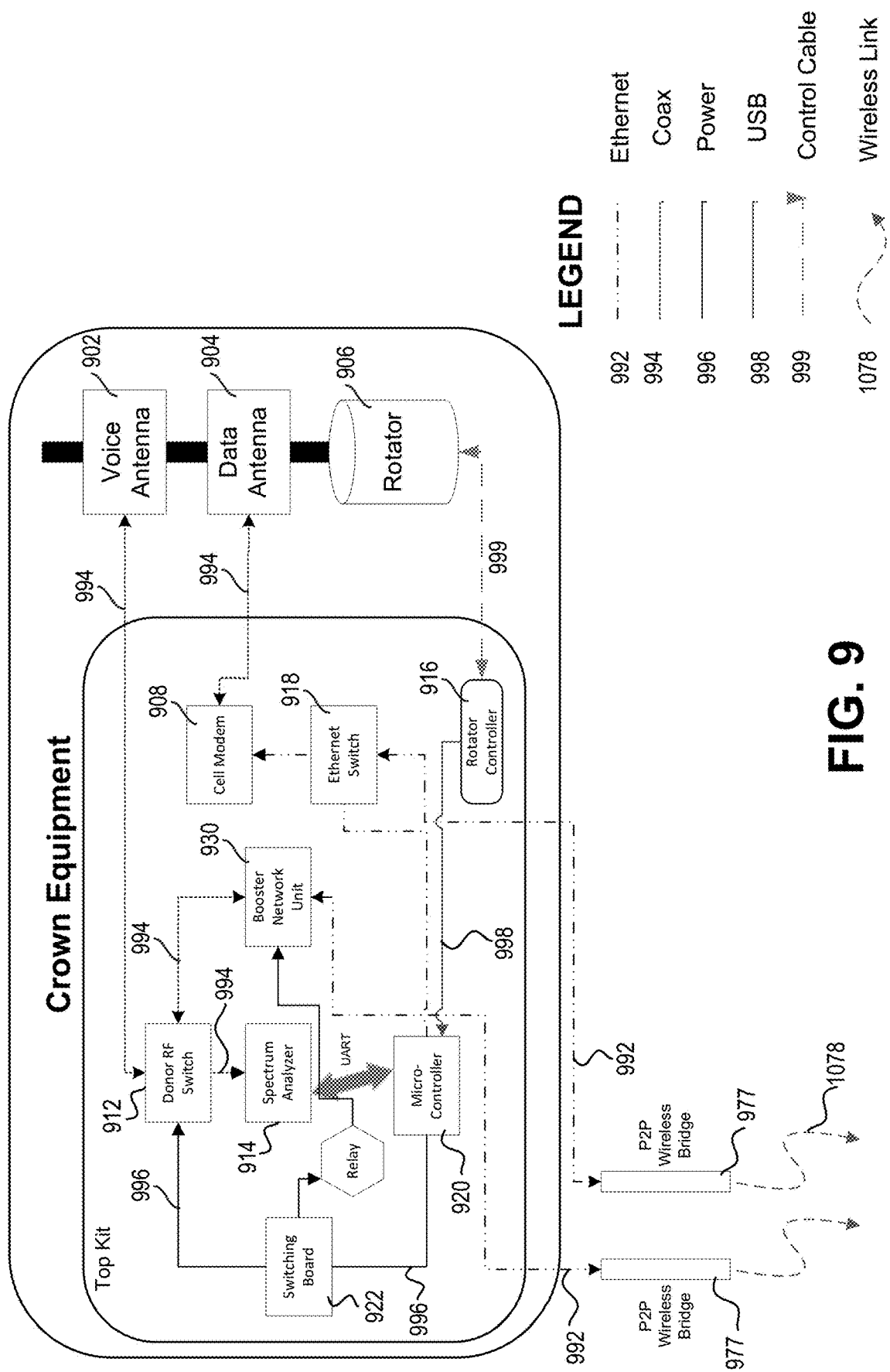
FIGS. 9 and 10 illustrate block diagrams of a signal repeater system, in accordance with embodiments of the present disclosure.
Figure 10:
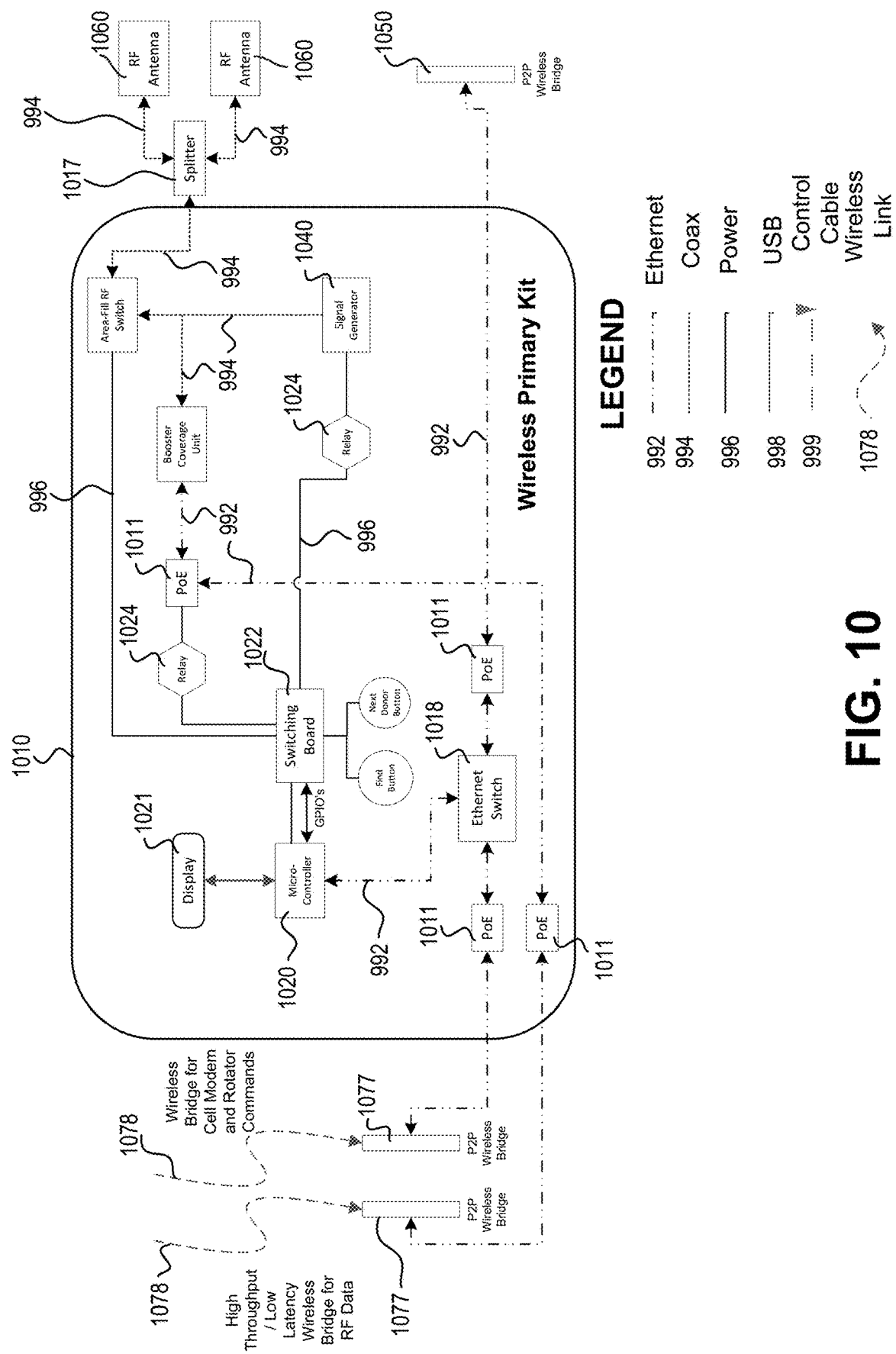

Reference is made to FIGS. 9 and 10, which illustrate block diagrams of a signal repeater system, in accordance with embodiments of the present disclosure. FIG. 9 illustrates a block diagram of crown gear, which may include a top kit 901 and a donor antenna circuit. FIG. 10 illustrates a block diagram of a wireless primary kit 1010 ("bottom kit") that may be coupled to the top kit 901 based in part on a wireless communication link.

In FIGS. 9 and 10, transmission line cables or other communication links may be configured to couple components of the respective sub-systems. In FIGS. 9 and 10, the components may be coupled by Ethernet cable 992, by coaxial cable 994, power cable 996, universal serial bus (USB) cable 998, control cable 999 (which may be any communication link providing control signals), or a wireless communication link 1078, among other examples of communication links. Features of transmission line cables may be similar to transmission line cables illustrated or described with reference to FIG. 1.

FIG. 9 illustrates a donor antenna circuit including a voice antenna 902 and a data antenna 904 coupled to a rotator 906. The donor antenna circuit and the rotator 906 may be similar to the components of the top kit 101 described with reference to FIG. 1.

In some embodiments, the top kit 901 illustrated in FIG. 9 may include wireless communication link components for communicating with the wireless primary kit 1010 of FIG. 10. Further, the top kit 901 may include one or more components that may implemented at a bottom kit illustrated in FIG. 1.

For example, the top kit 901 in FIG. 9 may include a donor RF switch 912, a spectrum analyzer 914, a booster network unit 930, a switching board 922, and a micro controller 920. By providing numerous analog signal-based components at the top kit 901, a required length of coaxial transmission line cable may be reduced, thereby reducing the amount of signal attenuation between one or both antennas of the donor antenna circuit (e.g., voice antenna 902 or data antenna 904). In some embodiments, one or more components of the top kit 901 may have corresponding features to similarly named components of the repeater system 100 of FIG. 1.

In some embodiments, the top kit 901 may further include network communication devices, such an Ethernet switch 918 coupled to wireless communication bridge devices 977 for providing a wireless communication medium between the top kit 901 and the wireless primary kit 1010.

In some embodiments, the crown gear may include a rotator controller 916. The rotator controller 916 may be configured based on processor-executable operations executed by the micro-controller 920. The rotator controller 916 may generate signals for generating rotational or translational movement at the rotator 906 for adjusting a directional position of the donor antenna circuit (902, 904).

In some embodiments, as a number of analog signal-based components may be configured within a top kit 901 atop a tower, drilling rig derrick, etc., the wireless primary kit 1010 of FIG. 10 may include fewer signal processing components as compared to the controller/booster 110 illustrated in FIG. 1.

In some embodiments, signal processing components illustrated in FIG. 10 may have similar features as similarly named and numbered components illustrated in FIG. 1. For example, the microcontroller 1020 may be configured to execute one or more operations similar to those of the microcontroller 120 described with reference to FIG. 1. For example, signal processing components such as the area-fill RF switch 1015, splitter 1017, AF antennas 1060, or the P2P wireless bridge 1050 may be configured with similar features as the area-fill RF switch 115, splitter 117, AF antennas 160, or the P2P wireless bridge 150 described with reference to FIG. 1.

The wireless primary kit 1010 of FIG. 10 may include a combination of Ethernet-related components, such as POE-injectors 1011 or Ethernet switches 1018 similar to POE-injectors 111 or Ethernet switches 118 of FIG. 1, respectively.

In some embodiments, a wireless communication link 1078 for coupling the top kit 901 and the wireless primary kit 1010 may be provided by wireless bridge devices for transmitting data sets between the top kit 901 and the wireless primary kit 1010. As an example, a set of Ubiquiti™ wireless bridge devices may provide a wireless communication link. Other types of wireless bridge devices may be used.

Figure 11:
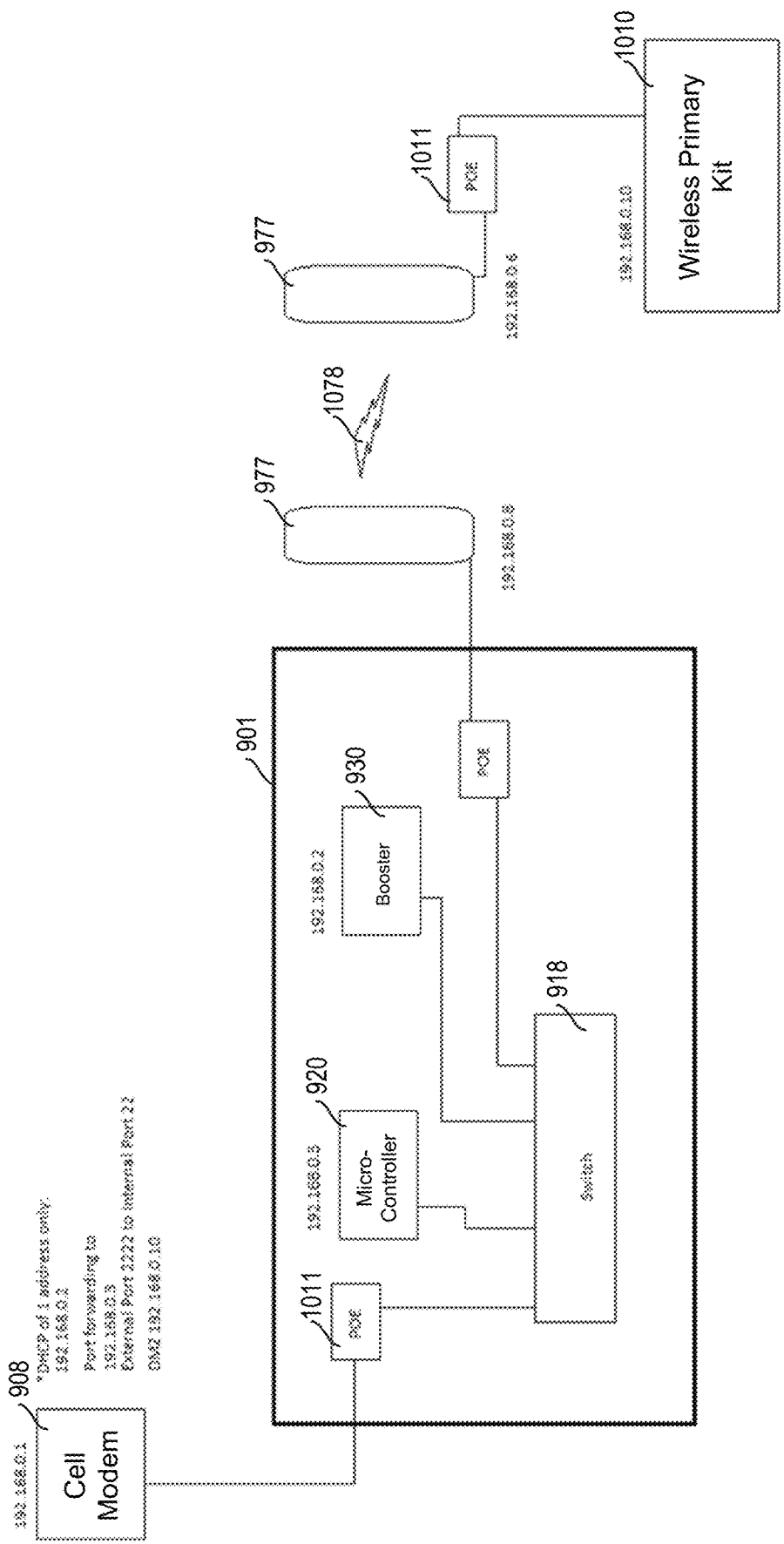
FIG. 11 illustrates a block diagram of network communication components of the signal repeater illustrated in FIGS. 9 and 10.

Reference is made to FIG. 11, which illustrates a block diagram of networking communication components of the signal repeater system described with reference to FIGS. 9 and 10, in accordance with embodiments of the present disclosure.

In FIG. 11, the wireless communication bridge devices 977 may be configured to provide the wireless communication link 1078 coupling the top kit 901 and the wireless primary kit 1010.

At the top kit 901, one or more of the micro-controller 920 and the booster network unit 930 may be assigned IP addresses and remotely configurable during system operation. In some embodiments, the cell modem 908 receiving signals by a data antenna 904 may be remotely configurable. In some embodiments, the wireless primary kit 1010 may also be assigned an IP address and be remotely configurable. Other network configurations for coupling or remotely accessing/configuring components of the top kit 901 and the wireless primary kit 1010 may be contemplated.

In some examples, omnidirectional antennas may radiate radio frequency power in a plurality of directions relative to a rotation axis (e.g., in radial direction, or other directions relative to the rotation axis). In some situations, it may be beneficial to include directional antennas in embodiments of signal repeater systems described in the present disclosure. In some embodiments, directional antennas may be configured to reduce interference caused by unintended signals proximal to a target signal. Further, directional antennas may be configured for providing relatively higher gain signal reception in a given orientation/direction, as compared to omnidirectional antennas. It may be beneficial to configure donor antenna circuits with one or more directional antennas.

Figure 12:
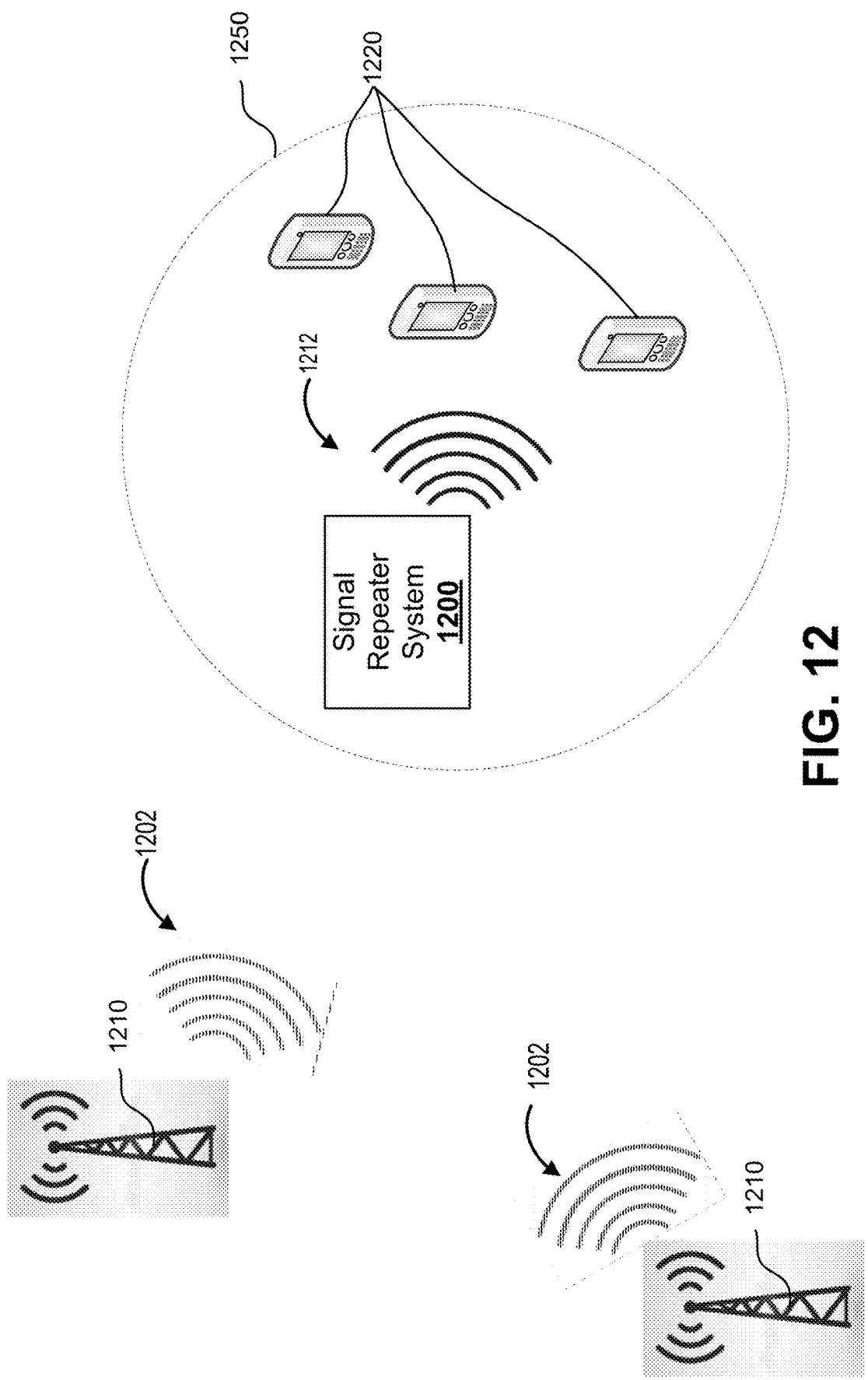
FIG. 12 illustrates a system level diagram showing a signal repeater system for re-broadcasting cellular signals, in accordance with embodiments of the present disclosure.

To describe features of embodiments disclosed herein, reference is made to FIG. 12, which illustrates a system level diagram showing a signal repeater system 1200 for re-broadcasting cellular signals, in accordance with embodiments of the present disclosure.

The signal repeater system 1200 may include features of the signal repeater system 100 described with reference to FIG. 1 or the signal repeater system described with reference to FIGS. 9 and 10. In some embodiments, the signal repeater system 1200 may be positioned proximal to a regional area 1250 in which cellular signal reception may be poor. From a perspective of one or more client devices 1220 (e.g., cellular devices, computing devices, among other examples) physically located within the regional area 1250, cellular signal reception may be weak or non-existent. For example, the regional area 1250 may be a remote location, such as at an oil exploration site, among other examples.

Embodiments of the signal repeater system 1200 may detect cellular signal streams 1202 from one or more cellular source towers 1210, and may receive the detected cellular signal streams 1202 and transmit the cellular signal streams 1202 as re-broadcasted cellular streams 1212 within the regional area 1250. Examples described herein include cellular signal streams and cellular systems; however, other types of signal streams and signal systems may be used.

In some situations, the cellular signal streams 1202 may include one or a combination of voice-based signals (e.g., signals associated with user telephone conversations) or data-based signals (e.g., for user consumption of data that may not rely on a substantially constant stream of signals). In some situations, it may be beneficial to provide signal repeater systems configured to orient a donor antenna circuit towards a selected cellular source tower 1210 based on prioritizing optimal voice-based signals as a primary goal, and optimizing data-based signals as a secondary goal Embodiments of signal repeater systems described herein may include directional antennas mounted to rotator devices for orienting the directional antennas relative to a target source, thereby receiving cellular signal streams having an optimized combination of signal metrics that may be suitable for re-broadcasting to client devices within the regional area 1202.

In some embodiments, a signal repeater may include a donor antenna circuit for receiving signal streams from one or more cellular source towers or transmit signal streams to the one or more cellular source towers. In some embodiments, the donor antenna circuit may include a rotator 906 (FIG. 9) and at least one of a voice antenna 902 or data antenna 904 respectively mounted to the rotator. In some embodiments, the voice antenna 902 and the data antenna 904 may be directional antennas, and may be oriented in a substantially similar direction. When the rotator 906 rotates a combination of the voice antenna 902 and the data antenna 904, the respective directional antennas may be oriented in a substantially similar direction towards a target cellular source tower.

In some situations, voice-based signal streams may be based on signal stream characteristics (e.g., frequency, bandwidth, among other characteristics) that may differ in-part from characteristics of data-based signal streams. Further, signal metrics associated with the respective voice-based or data-based signal streams may be more optimally determined based on signal metrics determined by different types of or variations of antennas. Accordingly, in some embodiments, the donor antenna circuit may include a voice antenna 902 separate from the data antenna 904, such that the signal repeater system may conduct operation for generating a plurality of signal metrics, such as RSSI, data throughput, or isolation metrics for respective individual antennas of the donor antenna circuit. The respective signal metrics may be associated with a plurality of orientations of the donor antenna circuit about a rotation axis of a rotator 906.

In some embodiments, to optimize signal stream transfer associated with various types of signals, the signal repeater system may be configured such that the voice antenna 902 may operate at different frequency band ranges as compared to the data antenna 904. In some embodiments, it may be beneficial to operate donor antenna components having different beam widths. Thus, embodiments of the donor antenna circuit may include two (e.g., voice antenna 902 in combination with a data antenna 904) or more antenna components configured thereon.

In some embodiments, a voice antenna 902 may be configured based on low frequency bands, such as the 700 MHz or 850 MHz frequency bands, based on relatively higher propagation characteristics. Such frequency bands may be more optimally configured to re-broadcast voice-based signal streams over greater distances.

In some embodiments, a data antenna 904 may be configured at relatively higher frequency bands as compared to the voice antenna 902, thereby configured to achieve greater transfer speeds. In some embodiments of the data antenna 904, repeating data may not be required as a primary goal because a wireless internet protocol (IP) based bridge may be used to provide data services across a local region. In some situations, higher frequency bands may have relatively poor propagation characteristics; however, operations of the signal repeater system may be configured to generate wireless shots rather than generating rebroadcasted signals.

Embodiments of donor antenna circuits described in the present disclosure include a voice antenna 902 distinct from a data antenna 904 to provide relatively greater performance for respective voice-based and data-based signals. The respective voice antenna 902 and the data antenna 904 may be configured/tuned for characteristics inherently beneficial to transmission of voice-based or data-based signal streams.

In some other embodiments, a donor antenna circuit having a unitary antenna device for transmitting/receiving both voice-based and data-based signal streams may be used. In the present example, the unitary antenna device may be tuned or configured to balance or trade-off characteristics inherently beneficial to transmission of voice-based or data-based signal streams.

In some embodiments, the donor antenna circuit may be oriented in a selected position about a rotation axis of the rotator and may be configured to receive cellular signal streams from cellular source towers for re-broadcasting to client devices within a regional area. The donor antenna circuit may also be oriented in the selected position to retrieve signal streams from client devices for transmission to cellular source towers. It may be beneficial to determine the desirable position of the donor antenna circuit based on a desirable combination of signal metrics. In some situations, it may be beneficial to determine a target position to orient a donor antenna circuit based on prioritizing a first signal type relative to at least one other co-existing signal type to be re-broadcast to a regional area.

Figure 13:
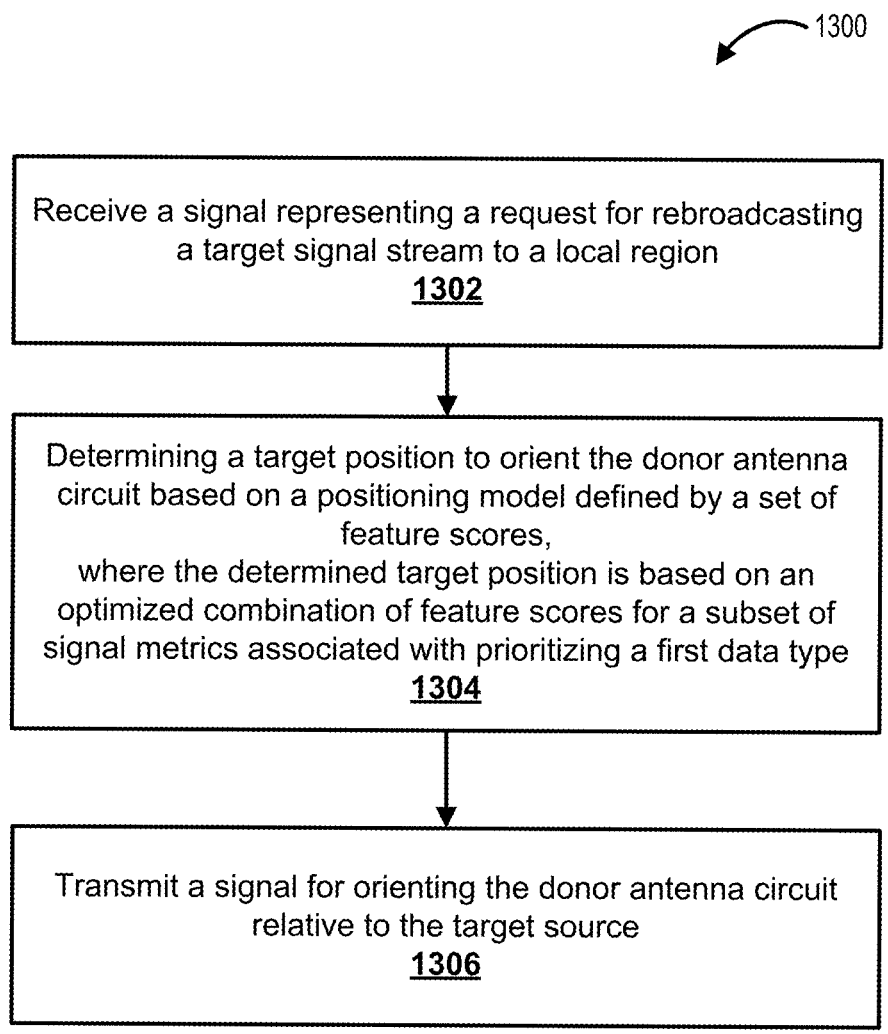
FIG. 13 is a flowchart of a method of rebroadcasting a target signal stream, in accordance with embodiments of the present disclosure.

To illustrate, reference is made to FIG. 13, which illustrates a flowchart of a method 1300 of rebroadcasting a target signal stream, in accordance with embodiments of the present disclosure. The method 1300 may include operations conducted by one or more micro-processors of signal repeater systems described herein (see e.g., micro-processors described with reference to FIG. 1, 9, or 10). The method 1300 may include operations, such as data retrievals, data manipulations, data storage, or other operations, and may include other computer-executable operations.

In some embodiments, systems for rebroadcasting a target signal stream may include a donor antenna circuit and a processor coupled to the donor antenna circuit. The donor antenna circuit may include a voice antenna and a data antenna mounted to a rotator. The rotator may be configured to rotate the donor antenna circuit to one or a plurality of positions about a rotation axis. The plurality of positions may be defined by a plurality of azimuth angles.

In some embodiments, the voice antenna and/or the data antenna may be directional antennas, and may be positioned in a substantially similar direction when directed towards or relative to a cellular source tower. By coupling a combination of the voice antenna and the data antenna to be directed in substantially similar directions, a combination of signal metrics may be determined for determining a most desirable donor antenna circuit orientation that otherwise may not be possible if the donor antenna circuit were to include only one antenna type (e.g., an antenna that may not be optimally tuned for voice-based or data-based signals, but tuned based on a compromise of the required signal characteristics of voice-based or data-based signals).

To describe features of the method 1300, reference will be simultaneously made to FIG. 12.

At operation 1302, the system may be configured to receive a signal representing a request for rebroadcasting a target signal stream (e.g., a cellular signal stream 1202) to a regional area 1250. The target signal stream may include a combination of a first signal type, such as a voice-based signal, and a second signal type, such as a data-based signal.

In some embodiments, the system may be configured to re-broadcast the target signal stream based on prioritizing a first signal type relative to a co-existing signal type. As will be described, it may be beneficial to determine a donor antenna circuit orientation that prioritizes a voice-based signal quality level as a primary objective and a data-based signal quality level as a secondary objective.

At operation 1304, the system may determine a target position for orienting the donor antenna circuit. The target position may be defined as an orientation about a rotation axis of a rotator 906 (FIG. 9) In some embodiments, the target position may be defined as an azimuth angle about the rotation axis.

The system may determine the target position based on a positioning model defined by a set of feature scores corresponding to one or more signal metrics. In some embodiments, the one or more signal metrics may include a received signal strength indicator, an uplink throughput, a downlink throughput, or an antenna isolation metric. In some other embodiments, the signal metrics may include at least one of reference signal received power (RSRP), reference signal received quality (RSRQ), or signal to interference and noise ratio (SINR) metrics. Other quantitative signal integrity metrics may be used.

In some embodiments, the system may be configured to define a plurality of azimuth angle increments about the rotation axis. As an example, the plurality of azimuth angle increments may be from 0 degrees to 350 degrees in 10 degree increments. When the system conducts operations to generate the positioning model, the system may iteratively orient the donor antenna circuit at a plurality of azimuth angles about the rotation axis.

At each of the plurality of azimuth angle increments, the system may generate signal metrics, and the generated signal metrics may be correlated with a feature score. In some embodiments, the respective feature scores may be akin to weights for determining an optimal/target donor antenna circuit orientation about the rotation axis.

In some embodiments, for each of a plurality of azimuth angle increments about the rotation axis, the system may determine RSSI at the donor antenna circuit. The system may identify a subset number of the plurality of azimuth angle increments at which the RSSI may be most favourable (e.g., strongest signal strength). For example, the system may identify five azimuth angle increments corresponding to the 5 most favourable RSSI values. The RSSI values may be associated with a feature score provided by a positioning model.

In some situations, a donor antenna circuit orientation with the most favourable RSSI value may not represent a donor antenna circuit orientation that may be most optimal based on other signal metrics. It may be beneficial to consider other signal metrics for determining a target position for the donor antenna circuit.

Accordingly, the system may be configured to determine a signal throughput metric at the donor antenna circuit for each of the identified azimuth angle increments (e.g., with 5 most favourable RSSI values). In some examples, signal throughput may include uplink signal speed and/or downlink signal speed. The signal throughput values may be associated with a feature score defined by the positioning model.

Further, for each of the identified azimuth angle increments, the system may be configured to transmit, via a re-broadcast antenna 1060 (FIG. 10), one or more isolation test signals and determine an antenna isolation metric based on detection of the isolation test signal at the donor antenna circuit. The isolation metric may be associated with a feature score defined by the positioning model.

Based on the plurality of signal metrics determined at a plurality of identified azimuth angle increments, the system may be configured to determine the target position for the donor antenna circuit based on an optimized combination of feature scores. In some examples, combination of the feature scores may be a summation of the feature scores representing the plurality of signal metrics. Other operations for combining feature scores representing the plurality of signal metrics may be contemplated. The optimized combination of feature scores may be representative of signal metrics of the donor antenna circuit at a particular orientation defined relative to a rotation axis of a rotator. For example, the particular orientation may be defined by an azimuth angle of the rotator.

Examples described herein include features for orienting a donor antenna circuit relative to a rotation axis. In some embodiments, the signal repeater system may be configured to orient the donor antenna circuit based on positions defined by elevation relative to a rotator platform, or other reference point. Other types of orientation adjustment positions for the donor antenna circuit may be used.

In some embodiments, the positioning model may be based on plots representing relationships between signal metric values (e.g., RSSI, data throughput, or isolation metrics) and feature scores. In some embodiments, favourable feature scores may be reflected by feature score values (e.g., greater values or less negative values). Referring again to FIG. 5, a more favourable RSSI measurement may correspond to a greater feature score value. In FIG. 8, a more favourable isolation metric may correspond to a smaller, or less negative, feature score value.

In some situations, signal stream types may be dependent on signal characteristics to be considered favourable signal streams. For example, voice-based signal streams may be regarded as favourable signals when RSSI values are greater and when uplink data throughput metrics are higher. As another example, data-based signal streams may be regarded as more favourable when downlink data throughput metrics may be higher. Thus, in some embodiments, such bias towards particular signal characteristics for different types of signal streams may be captured by data points of the scoring curves/plots associated with particular signal metrics.

In an example where voice-based signal streams may be prioritized over data-based signal streams, the scoring curve associated with RSSI values (FIG. 5) may be re-generated to allocate a greater number of feature score values for RSSI values meeting approximately −70 dBm. Other examples adjusting scoring curves for biasing the positioning model to reflect prioritization of signal stream types may be contemplated.

At operation 1306, the system may transmit a signal for orienting the donor antenna circuit for rebroadcasting the target signal stream to the regional area 1250.

Embodiments of the systems described herein may be configured to determine an optimal target position for orienting the donor antenna circuit based on a combination of signal metrics, thereby taking into account advantages and/or disadvantages that may be inherent in a plurality of signal characteristics of cellular signal streams.

As an example, in situations where a signal repeater system may be configured to prioritize data-based signal streams (e.g., downlink data speed is a priority), the signal repeater system may be configured with a positioning model for orienting the donor antenna circuit towards a cellular source tower that may be physically further away (e.g., associated with a lower RSSI value) but nonetheless may provide a greater downlink data throughput speed than a nearby cellular source tower.

In some embodiments, positioning models defined by scoring curves associated with signal metrics (e.g., FIG. 5, 6, 7, or 8) may be dynamically re-generated or updated based on alterations of signal stream re-broadcasting specifications. For example, in scenarios where the signal repeater system receives a signal representing a user request to prioritize reducing occurrences of signal interference, the signal repeater system may update positioning models (e.g., represented by scoring plots) to associate greater feature score values when a donor antenna circuit is oriented to receive signal streams with negligible signal interference.

In another example, the signal repeater system may receive a signal representing a user request to update positioning models when the signal repeater system may be removed from a regional area 1350 and re-located to another location. In another example, the signal repeater system may receive a signal representing a user request to update positioning models when nearby cellular source towers may be relocated. In such example scenarios, the positioning models (represented by scoring plots) may no longer be representative of signal stream characteristics for the plurality of orientations defined by azimuth angles about the rotational axis of a rotator. Thus, positioning models described herein may be updated or re-generated based on changes of a cellular signalling platform over time (e.g., changes to positioning of cellular source devices, the signal repeater system, or both).

In some embodiments, the signal repeater system may be configured to update the positioning model in response to the optimized combination of feature scores for a subset of signal metrics meeting a threshold value. In some embodiments, the threshold value may be prior defined for identifying a minimally viable donor antenna circuit orientation relative to a target source (e.g., nearby cellular source antenna). For example, in a scenario where a first signal type is prioritized relative to a co-existing signal type, the minimally viable donor antenna circuit orientation may represent a combination of feature scores that corresponds to signal metrics for the co-existing signal type (e.g., data-based signal stream).

Such features may avoid potential situations where a voice-based signal stream may be optimized at the expense of unacceptable data-based signal streams. Thus, in response to the signal repeater system determining that the optimized combination of features scores meets a threshold value, the signal repeater system may be configured to re-generate positioning models to provide minimally viable donor antenna circuit orientations. It may be contemplated that the positioning models may be re-generated or updated in situations where environmental conditions may have changed (e.g., weather changes, surrounding land elevation changes due to construction, among other examples), or where one or more of cellular source towers or the signal repeater system may be re-located.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be flash memory, a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only. The described embodiments are susceptible to many modifications of form, arrangement of parts, details and order of operation. The disclosure is intended to encompass all such modifications within its scope, as defined by the claims.

What is claimed is:

1. A system for rebroadcasting a target signal stream comprising:
   a donor antenna circuit;
   a processor coupled to the donor antenna circuit; and
   a memory coupled to the processor and storing processor-executable instructions that, when executed, configure the processor to:
      receive a signal representing a request for rebroadcasting a target signal stream to a local region, the target signal stream associated with prioritization of a first signal type relative to at least one co-existing signal type;
      determining a target position to orient the donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and
      transmitting a signal to orient the donor antenna circuit relative to the target source.

2. The system of claim 1, wherein the donor antenna circuit includes:
   a rotator configured to rotate the donor antenna circuit to a plurality of positions defined by azimuth angles;
   a voice antenna mounted to the rotator; and
   a data antenna mounted to the rotator, the data antenna oriented in a substantially similar direction relative to the target source as the voice antenna.

3. The system of claim 2, wherein the data antenna and the voice antenna include directional antennas.

4. The system of claim 1, wherein the first signal type includes a voice stream, and wherein at least one of the co-existing signal types includes a data stream.

5. The system of claim 1, wherein the one or more signal metrics includes at least one of received signal strength indicator (RSSI), uplink throughput, downlink throughput, or antenna isolation.

6. The system of claim 1, wherein the set of feature scores includes a value associated with the respective one or more signal metrics at the plurality of positions about a rotation axis.

7. The system of claim 6, wherein the respective positions about a rotation axis is defined by azimuth angles at least 40 degrees apart from another position.

8. The system of claim 1, wherein the first signal type includes a voice stream, and wherein the subset of signal metrics associated with prioritizing the first signal type includes at least one of RSSI or uplink throughput.

9. The system of claim 8, wherein the RSSI signal metric is determined based on a maximum hold technique based on an average of maximum readings for a number of sample points measured over a number of trace sweeps.

10. The system of claim 1, wherein determining the target position based on the optimized combination of feature scores includes:
at a plurality of defined azimuth angle increments about a rotation axis, determining a RSSI at the donor antenna circuit;
identifying a subset of positions about the rotation axis as defined by azimuth angle increments based on the greatest measured RSSI values;
for the respective identified subset of positions about the rotation axis:
orienting the donor antenna at that position defined the respective azimuth angle; and
determining a signal throughput at the donor antenna circuit at that position defined by the respective azimuth angle; and
determining a combination of feature scores based on the RSSI and signal throughput metrics at the respective identified positions about the rotation axis.

11. The system of claim 10, wherein determining the target position based on the optimized combination of feature scores includes:
for the respective identified subset positions about the rotation axis:
transmitting, via a re-broadcast antenna, an isolation test signal; and
determining an antenna isolation metric based on detection of the isolation test signal at the donor antenna circuit;
and wherein determining the combination of feature scores is based on a combination of the RSSI, the signal throughput metric, and the antenna isolation metric associated with each of the identified subset positions about the rotation axis.

12. The system of claim 1, wherein the processor-executable instructions, when executed, configure the processor to: update the positioning model in response to the optimized combination of feature scores for the subset of signal metrics meeting a threshold value.

13. A method for rebroadcasting a target signal stream comprising:
receiving a signal representing a request for rebroadcasting a target signal stream to a local region, the target signal stream associated with prioritization of a first signal type relative to at least one co-existing signal type;
determining a target position to orient a donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and
transmitting a signal to orient the donor antenna circuit relative to the target source.

14. The method of claim 13, wherein the first signal type includes a voice stream, and wherein at least one of the co-existing signal types includes a data stream.

15. The method of claim 13, wherein the one or more signal metrics includes at least one of received signal strength indicator (RSSI), uplink throughput, downlink throughput, or antenna isolation.

16. The method of claim 13, wherein the set of feature scores includes a value associated with the respective one or more signal metrics at the plurality of positions about a rotation axis, and wherein the respective positions about a rotation axis is defined by azimuth angles at least 40 degrees apart from another position.

17. The method of claim 13, wherein the first signal type includes a voice stream, and wherein the subset of signal metrics associated with prioritizing the first signal type includes at least one of RSSI or uplink throughput.

18. The method of claim 13, wherein determining the target position based on the optimized combination of feature scores includes:
at a plurality of defined azimuth angle increments about a rotation axis, determining a RSSI at the donor antenna circuit;
identifying a subset of positions about the rotation axis as defined by azimuth angle increments based on the greatest measured RSSI values;
for the respective identified subset of positions about the rotation axis:
orienting the donor antenna at that position defined the respective azimuth angle; and
determining a signal throughput at the donor antenna circuit at that position defined by the respective azimuth angle; and
determining a combination of feature scores based on the RSSI and signal throughput metrics at the respective identified positions about the rotation axis.

19. The method of claim 18, wherein determining the target position based on the optimized combination of feature scores includes:
for the respective identified subset positions about the rotation axis:
transmitting, via a re-broadcast antenna, an isolation test signal; and
determining an antenna isolation metric based on detection of the isolation test signal at the donor antenna circuit;
and wherein determining the combination of feature scores is based on a combination of the RSSI, the signal throughput metric, and the antenna isolation metric associated with each of the identified subset positions about the rotation axis.

20. A non-transitory computer-readable medium or media having stored thereon machine interpretable instructions which, when executed by a processor, cause the processor to perform a computer-implemented method for rebroadcasting a target signal stream, the method comprising:
- receiving a signal representing a request for rebroadcasting a target signal stream to a local region, the target signal stream associated with prioritization of a first signal type relative to at least one co-existing signal type;
- determining a target position to orient a donor antenna circuit relative to a target source providing the target signal stream, the target position based on a positioning model defined by a set of feature scores corresponding to one or more signal metrics, wherein the target position is determined based on an optimized combination of feature scores for a subset of signal metrics associated with prioritizing the first signal type; and
- transmitting a signal to orient the donor antenna circuit relative to the target source.

\* \* \* \* \*